US008460566B2

(12) United States Patent  
Costin, Jr.

(10) Patent No.: US 8,460,566 B2  
(45) Date of Patent: Jun. 11, 2013

(54) STAGGERED LASER-ETCH LINE GRAPHIC SYSTEM, METHOD AND ARTICLES OF MANUFACTURE

(75) Inventor: Darryl J. Costin, Jr., Avon, OH (US)

(73) Assignee: Echelon Laser Systems, LP, West Chicago, IL (US)

( * ) Notice: Subject to any disclaimer, the term of this patent is extended or adjusted under 35 U.S.C. 154(b) by 221 days.

(21) Appl. No.: 12/768,122

(22) Filed: Apr. 27, 2010

(65) Prior Publication Data

US 2010/0272961 A1 Oct. 28, 2010

Related U.S. Application Data

(60) Provisional application No. 61/172,893, filed on Apr. 27, 2009.

(51) Int. Cl.  
*B44C 1/22* (2006.01)  
*B32B 3/10* (2006.01)  
*B23K 26/38* (2006.01)

(52) U.S. Cl.  
USPC ..... 216/65; 216/59; 219/121.69; 219/121.78; 219/121.68

(58) Field of Classification Search  
USPC .................... 216/59, 65; 219/121.69, 121.78, 219/121.68  
See application file for complete search history.

(56) References Cited

U.S. PATENT DOCUMENTS

| | | | |
|---|---|---|---|
| 3,720,784 A | 3/1973 | Maydan et al. | |
| 3,789,421 A | 1/1974 | Chivian et al. | |
| 4,024,545 A | 5/1977 | Dowling et al. | |
| 4,629,858 A | 12/1986 | Kyle | |
| 4,847,184 A | 7/1989 | Taniguchi et al. | |
| 4,861,620 A | 8/1989 | Azuma | |
| 4,947,022 A | 8/1990 | Ostroff et al. | |
| 5,017,423 A | 5/1991 | Bossmann et al. | |
| 5,075,195 A | 12/1991 | Baebler et al. | |
| 5,171,450 A | 12/1992 | Hoots | |
| 5,171,650 A | 12/1992 | Ellis et al. | |
| 5,185,511 A | 2/1993 | Yabu | |
| 5,200,592 A | 4/1993 | Yabu | |
| 5,567,207 A | 10/1996 | Lockman et al. | |
| 5,886,317 A | 3/1999 | Hinrichs et al. | |
| 5,990,444 A | 11/1999 | Costin | |
| 6,140,602 A | 10/2000 | Costin | |
| 6,231,196 B1 * | 5/2001 | Mahachek | 359/838 |
| 6,252,196 B1 | 6/2001 | Costin et al. | |
| 6,315,202 B2 | 11/2001 | Costin et al. | |

(Continued)

FOREIGN PATENT DOCUMENTS

| | | |
|---|---|---|
| DE | 3916126 | 11/1990 |
| EP | 0 946 042 | 9/1999 |

(Continued)

*Primary Examiner* — Shamim Ahmed  
(74) *Attorney, Agent, or Firm* — Berenato & White, LLC

(57) ABSTRACT

A staggered laser-etch line graphic system, method, and articles of manufacture are provided. One described method includes the steps of laser engraving a first plurality of lines associated with a first component section of a graphic on a surface of an article; laser engraving a second plurality of lines associated with a second component section of the graphic on the surface of the article; and controlling said laser engraving of the first plurality of lines and said laser engraving of second plurality of lines to reduce the visual impact of a demarcation line separating the first component section of the graphic and the second component section of the graphic.

20 Claims, 20 Drawing Sheets

U.S. PATENT DOCUMENTS

| | | |
|---|---|---|
| 6,495,237 B1 | 12/2002 | Costin |
| 6,576,862 B1 | 6/2003 | Costin et al. |
| 6,664,505 B2 | 12/2003 | Martin |
| 6,685,868 B2 | 2/2004 | Costin |
| 6,753,501 B1 | 6/2004 | Costin et al. |
| 6,807,456 B1 | 10/2004 | Costin et al. |
| 6,819,972 B1 | 11/2004 | Martin et al. |
| 6,858,815 B1 | 2/2005 | Costin |
| 7,699,896 B1 | 4/2010 | Colwell |
| 7,964,820 B2 * | 6/2011 | Bann .................. 219/121.69 |
| 2002/0043522 A1 | 4/2002 | Aberle et al. |
| 2007/0108170 A1 | 5/2007 | Costin, Sr. et al. |

FOREIGN PATENT DOCUMENTS

| | | |
|---|---|---|
| GB | 2 105 944 | 3/1983 |
| GB | 2294656 | 5/1996 |
| JP | 1-95885 | 4/1989 |
| JP | 3-45578 | 2/1991 |
| JP | 5-138374 | 6/1993 |
| WO | 93/22944 | 11/1993 |
| WO | WO 2006/025016 | 3/2006 |

* cited by examiner

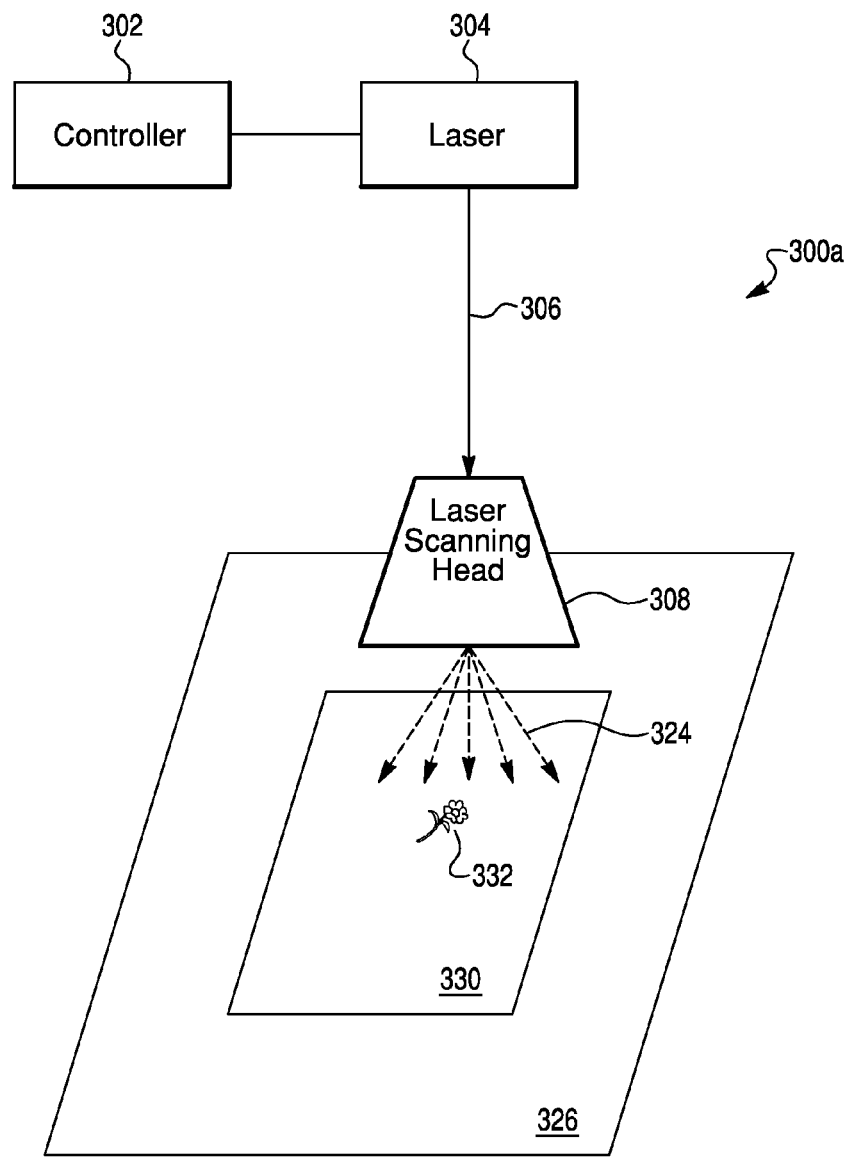

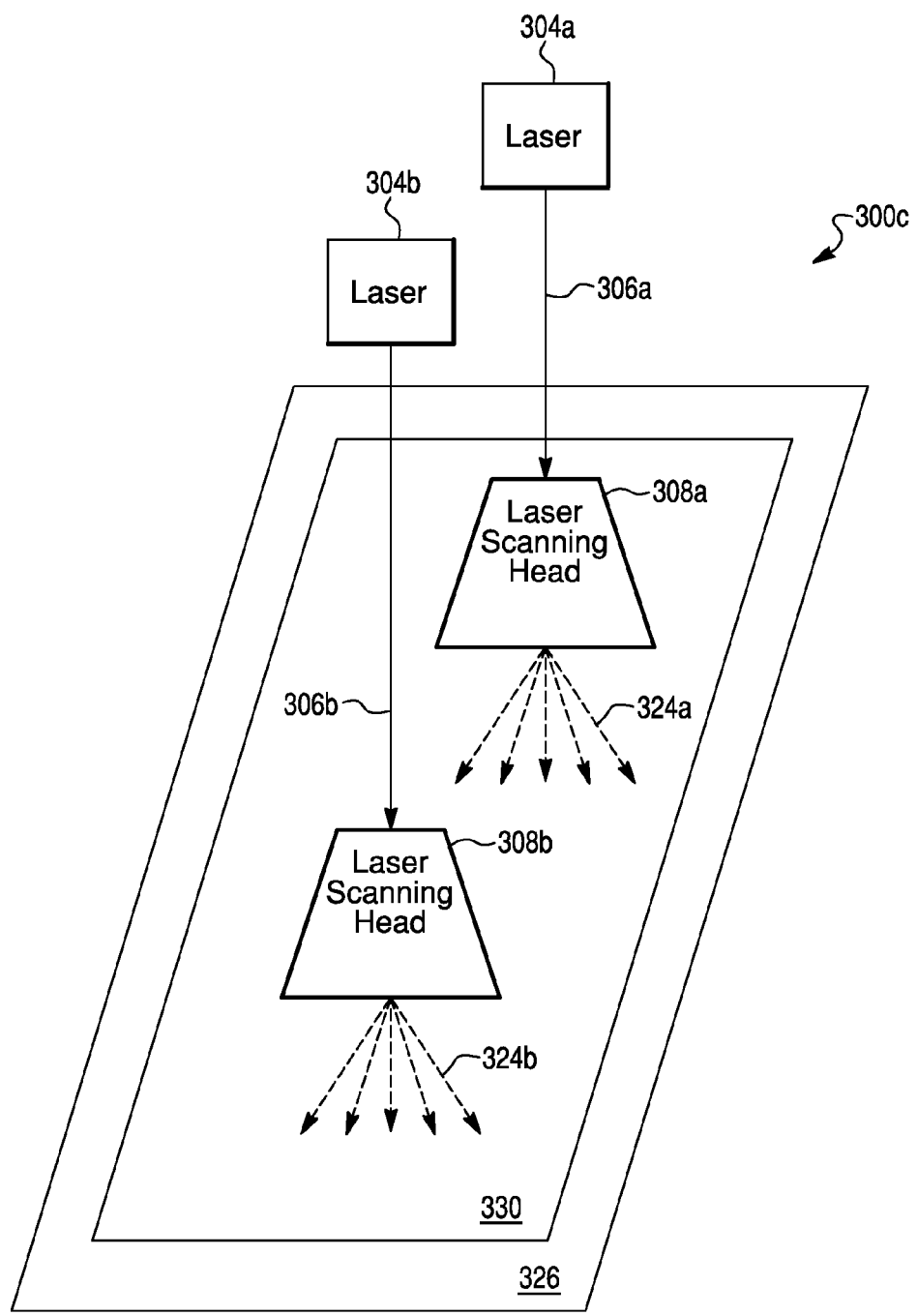

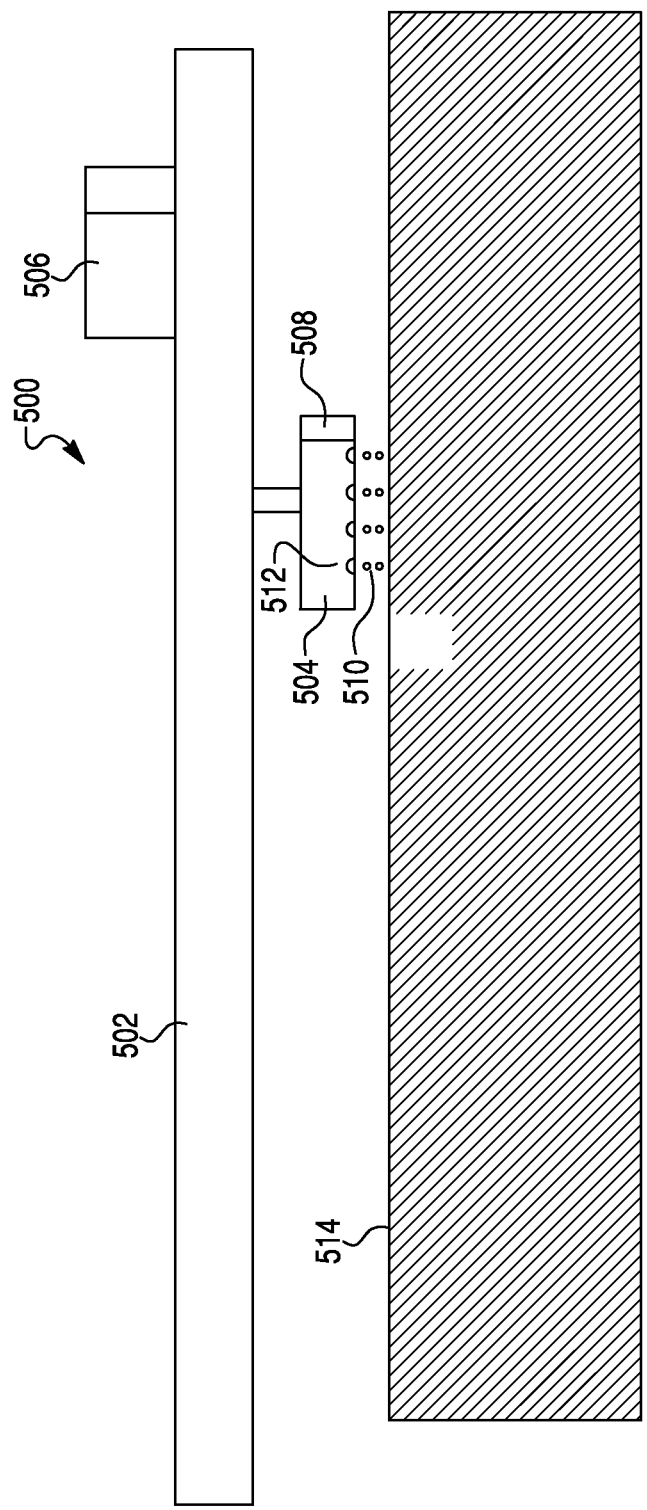

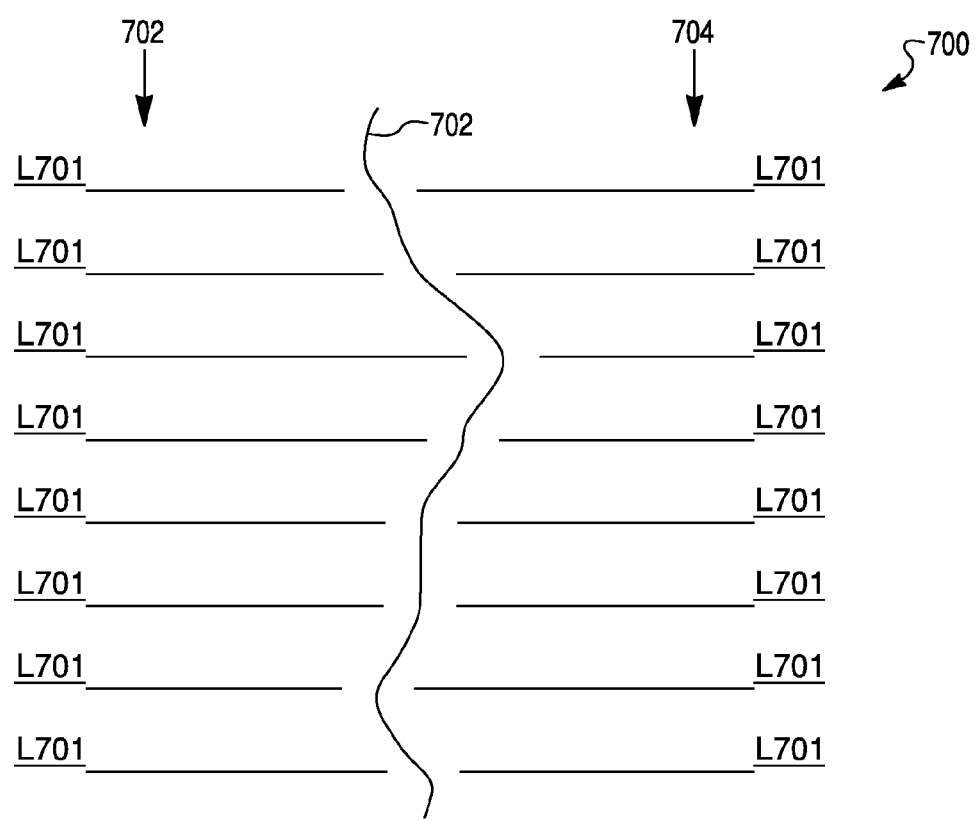

1002

STAGGERED LASER-ETCH LINE GRAPHIC SYSTEM, METHOD AND ARTICLES OF MANUFACTURE

CROSS-REFERENCE TO RELATED APPLICATIONS AND CLAIM TO PRIORITY

This patent application claims the benefit of U.S. Provisional Application No. 61/172,893, entitled "Staggered Laser-Etch Line Graphic System, Method and Articles of Manufacture," and filed Apr. 27, 2009, the entirety of which is incorporated herein and to which priority is claimed.

FIELD OF THE INVENTION

The present invention relates to laser engraving graphics onto article surfaces, and more particularly to a staggered laser-etch line graphic system, method, and articles of manufacture.

BACKGROUND OF THE INVENTION

Manufactured articles can present large or substantial viewable surface areas. Often it is desirable to apply a graphic design to one or more of these surface areas. Graphic designs include ordered patterns, random non-patterns, discrete simple graphic elements, complex graphical images and the like. Printing, painting, and engraving are just a few examples of techniques that may be employed to apply a graphic design to an article. Engraving may involve carving, cutting, or etching the surface of the assembly components to permanently remove surface area material of the article. Laser etching is particularly useful for creating graphic designs on the surface of an article. The graphic design may be etched into the article surface during its manufacture. A design may be applied after an article has been incorporated as a component to another article or structure. Common articles having substantial surface areas for applying a graphic design are boards, doors, facings, floors, moldings, siding, fencing, railing, and walls.

One of the difficulties associated with the laser etching of a graphic design over a substantial surface area is that laser etching equipment is typically not capable of etching a large detailed graphic design in a single unitary application of the whole graphic over the surface on an article. This difficulty is particularly acute when the articles of manufacture are mass-produced in a repeating process or a continuous process such as an extrusion process. This can occur in the context of a manufacturing assembly line process involving the continuous repeated applications of a detailed graphic design in real-time. This can be a high-speed process as occurs with articles having a flat surface. Or a slower process involving the application of a complex graphic design to a flat, curved or three-dimensional surface of an article, such as in an indexing process of manufacture performed on a continuous or batch basis. To some extent the difficulties in applying a detailed or complex laser etched graphic design can also occur in craft-based methods of manufacturing.

To address this need, computerized laser etching methods have been developed for laser marking a graphic design in smaller sub-component sections of a multi-component assembly of the whole graphic design. The graphic design is first partitioned into a plurality of graphic design component sections. Each of the graphic design sections is assigned to a corresponding component section of the surface area divided into a plurality of components for presenting the whole graphic design. The graphic design sections are laser marked onto corresponding component sections of an article's surface area. The graphic image may be no larger than the field size of the laser, however.

A problem can arise in the context of joining the component sections during the laser etching process to form a unitary image of a whole graphic design, particularly for relatively large work pieces that have a visible area exceeding the field size of the laser. The location at which the component sections of the graphic are joined is called the border or demarcation line, wherein the laser etched lines from separate component sections of the whole graphic meet together. Often this meeting point will involve a slight gap or a slight overlap in the laser graphic lines associated with separate but adjoining component sectional areas. This problem typically arises in the application of joined graphic designs as the meeting point will involve a visually perceptible imperfection forming a notable demarcation line between the two component sections of the graphic design when applied by laser etching. The demarcation is a substantial problem as it detracts from the overall aesthetic quality of the manufactured article.

BRIEF SUMMARY OF THE INVENTION

A first aspect of the invention provides a method for reducing a visual impact of a demarcation line of a graphic, the method comprising laser engraving a first plurality of lines associated with a first component section of a graphic on a surface of an article; laser engraving a second plurality of lines associated with a second component section of the graphic on the surface of the article; and controlling said first plurality of lines and said second plurality of lines to reduce the visual impact of a demarcation line separating the first component section of the graphic and the second component section of the graphic.

Another aspect of the invention provides a method for laser engraving a graphic on an article, the method comprising laser engraving a graphic on a surface of an article, the graphic comprised of a first plurality of lines and a second plurality of lines adjoined in a curvilinear section.

Another aspect of the invention provides a method of making an article of manufacture with a laser etched graphic applied on a surface of the article in at least two component sections, sharing at least one border, and forming a unitary image of the graphic on the surface of the article, wherein such unitary image is greater than the field size of a laser and where the method involves using multiple lasers to etch the individual sections such that the complete graphic is lazed on the part which is larger than the field size of the laser.

Another aspect of the invention provides an article of manufacture having a laser etched graphic, said article comprising a first plurality of laser engraved lines associated with a first component section of a graphic; a second plurality of laser engraved lines associated with a second component section sharing a border with said first component section of said graphic; wherein the first plurality of lines and the second plurality of lines are controlled to reduce the visual impact of a demarcation line separating the first component section and the second component section.

Another aspect of the invention provides a system for laser engraving a graphic on a surface of an article, comprising a laser engraving apparatus for laser engraving a surface of an article, and a visual impact controller in communication with the laser engraving apparatus and configured to reduce the visual impact of a demarcation line separating a first plurality of laser engraved lines and a second plurality of laser engraving lines by controlling the laser engraving of the first plurality of laser engraving lines and the second plurality of laser engraving lines.

Another aspect of the invention provides a method for laser engraving a graphic on an article, the method comprising providing a laser having a defined native field size; formatting a graphic having at least one dimension exceeding the defined native field size into a plurality of portions which collectively define a unity graphic image; providing a surface having a dimension exceeding the native field size; and laser engraving the plurality of portions onto the surface to reproduce the unitary graphic image onto the surface.

Other aspects of the invention, including apparatus, systems, methods, and the like which constitute part of the invention, will become more apparent upon reading the following detailed description of the exemplary embodiments and viewing the drawings.

BRIEF DESCRIPTION OF THE DRAWINGS

The accompanying drawings and color photos are incorporated in and constitute part of the specification. The drawings, together with the general description given above and the detailed description of the exemplary embodiments and methods given below, serve to explain the principles of the invention. In such drawings:

FIG. 3A is a schematic view of a system for staggered laser etch lines according to another embodiment of the invention;

FIG. 3C is a schematic view of a system for staggered laser etch lines where multiple lasers are utilized to create the graphic according to another embodiment of the invention;

FIG. 5 is a schematic view of a printer applying ink and laser scribing to an article having a channel feature according to another embodiment of the invention;

FIG. 7 is a schematic view of a graphic image that is composed of a series of discontinuous lines, as may be the case for some low density wood grain images, in which case individual graphic sections that make up the unitary graphic image may be divided into two parts by an adjoining line that is curvilinear;

DETAILED DESCRIPTION OF THE PREFERRED EMBODIMENT(S)

Figure 1:
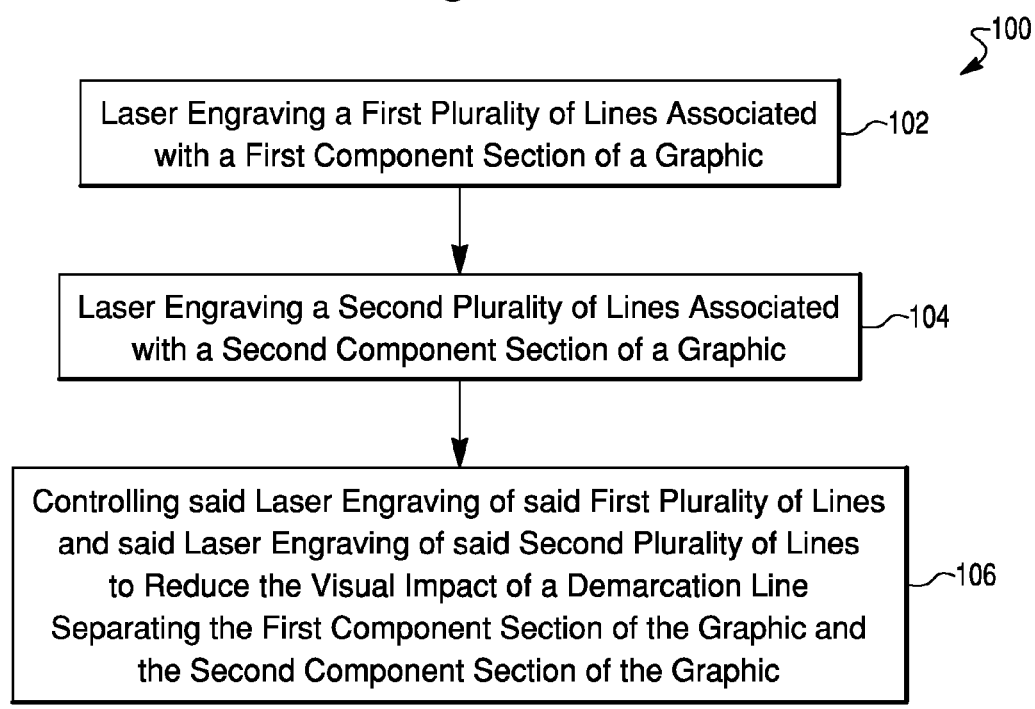
FIG. 1 is a flowchart of a method for staggered laser etch lines according to an embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods. The invention according to its various aspects is particularly pointed out and distinctly claimed in the attached claims read in view of this specification, and appropriate equivalents.

The terms "laser" and "laser beam" may be used interchangeably. The terms "mark" and "scribe" are used interchangeably herein, and as used mean to irradiate an article or component, such as a board made of plastic lumber, with a laser to form a graphic design, such as a wood grain image. In the course of marking and scribing, the laser causes a visually perceptible change to the article surface, such as by causing removal, ablation, or etching of surface material or color transformation of a dye. The result is a visually-perceptible graphic on the article, made up of laser etch lines forming a design, pattern, etc.

The terms "graphic" and "graphic design" are used interchangeably herein, and as used herein, refer to decorative and artistic designs, non-decorative designs, patterns, graphic images, wood grain, alpha-numeric characters, corporate and trade logos, or other markings, etc.

The terms "lines per inch" and "LPI" refer to the density of the graphic laser lines within a single inch perpendicular cross-section length of the area to be laser etched. More specifically, this relates to the number of graphic laser lines etched within a perpendicular cross-length. These measures are expressed in LPI amounts, such as the higher density 60 LPI or lower density 40 LPI measures referring, respectively, to a laser etching with 60 or 40 laser-etching lines within a perpendicular cross-section having a width of one inch.

The term "border" or "border line", when used in reference to the border formed between two graphic component sectional areas, refers to the section or area formed or left between two component sections of a laser engraved graphic. When a graphic is applied in unmodified component sections (i.e., without staggering and/or randomizing as described below), than the border may comprise a highly visual straight line. The border between component sections may or may not be modified to minimize any visual imperfections in the application of the graphic design. An unmodified border in the context of the invention will generally present a discrete straight line between component sections, which if visually perceptible is also a demarcation.

The term "demarcation" "line of demarcation", or "demarcation line", when used in reference to the border formed between two graphic component sections, refers to the visually perceptible marking between the component sections in a graphic design when applied in component sections by laser etching of laser graphic lines without modification to the laser graphic lines in the component sections to minimize or overcome the perceptibility of the demarcation.

The terms "interlaced" or "staggering", when used in reference to the staggering of graphic laser lines at the border between two graphic component sectional areas, refers to the percentage of overlap at the border of the laser graphic lines from the two separate component sectional areas. For example, "staggering" means that a graphic laser line from a first component sectional area can extend across the straight border into the second component sectional area. The term "10% staggering" means the cross-border extension of the laser-etching line may vary, randomly or otherwise, from 0 to 10% of the component section length, when both the first and second component sectional areas have equal dimensions of height and length. The staggering is generally automated using a computer program or software module.

The terms "randomized sub-unit length" or "randomization of sub-unit length", when used in reference to graphic laser lines forming a component sectional area of a design graphic, means the randomized breaking-up or partitioning of the graphic laser etch lines to randomized sub-unit lengths. These sub-unit lengths are permutations of other depending on the number of sub-units into which the whole graphic line is partitioned, and the degree of variability in sub-unit lengths elected in the designated degree of randomization chosen. The randomization is generally automated using a random number generator or the like within a computer program or software module.

The terms "staggered" or "staggering", when used in reference to graphic laser-etched lines forming a component sectional area of a design graphic, refers to the use of the techniques of staggering, randomization or a combination of both these techniques in the laser etching of graphic lines in the component sections in order to minimize, overcome or remove the perceptibility of visual imperfections in the component sections of design graphic, such as a demarcation line between component sections. The staggering is generally automated using a computer program or software module.

The term "article" or "manufactured article" as used herein includes but is not limited to building components. Building components include, for example and not necessarily limitation, flooring, decking, wall panels, door panels, door trim, siding, cabinetry, railings, moldings, etc. For explanatory purposes, exemplary embodiments below are described in relation to building components. It should be understood that the methods and systems described herein and the following exemplary embodiments may be used for marking/scribing components other than building components such as plastic components, textile fabrics, leather and vinyl articles, etc.

The articles of manufacture according to the invention are not limited as to the materials from which they are made. Exemplary materials that may be laser-etched or otherwise marked or treated using the systems and methods embodied herein include plastic lumber, glass (tempered glass and/or annealed glass), stone, ceramic, granite, leather, wood, engineered wood, laminates, metal, specialty polymers, gypsum, fiberglass reinforced plastic, wood composites, vinyl, acrylic, polyvinylchloride, hardboard, veneer, low profile carpet tiles, fabrics, paper, etc.

U.S. Pat. No. 6,692,815 entitled "Extruded Plastic Lumber and Method of Manufacture" discloses conventional plastic lumber made with high-density polyethylene or polypropylene, combined with wood flour and other fillers, and the methods of making the plastic lumber. Another plastic lumber material is disclosed in U.S. Pat. No. 5,539,027, entitled "Advanced Polymer/Wood Composite Structural Member" disclosing another polymer-wood composite that may make up the article for laser etching or other marking. This is a PVC plastic lumber composite containing, for example, 30 to 50 wt % of sawdust along with 50 to 70 wt % of a polyvinylchloride (PVC) polymer.

Laser etching is the practice of using lasers to etch, mark or decorate an object. The technique can be complex and a computer system is desirable to drive the movements of the laser beam. Despite this complexity, very precise and clean engravings can be achieved at a high rate. The technique does not involve tool bits which contact the engraving surface and wear out. This is considered an advantage over alternative engraving technologies where bit heads have to be replaced regularly. A laser etching machine can be thought of as three main parts: a laser, a controller, and a surface. The laser is like a pencil—the beam emitted from it allows the controller to trace lines or patterns onto the surface. The beam may either remove material from the substrate upon which it impinges or it may transform a dye that coats the surface or is intermixed into the substrate. The result is either a removal of material or a color transformation or both, with the result that the graphic is applied to the surface. The controller is usually a computer and controls the direction, intensity, speed of movement, and spread of the laser beam aimed at the surface. The surface is picked to match what the laser can act on.

There are three general types of laser etching machines. In an X-Y table, usually, the workpiece surface is stationary and the laser or laser scan head moves around in X and Y directions drawing raster bits or vector lines. In a second general type, the laser is stationary and the workpiece moves. Sometimes the workpiece moves in the Y axis and the laser in the X axis. A third type of type of laser etching machine is for three-dimensional workpieces where the laser traverses a three-dimensional surface, such as in an indexed manufacturing operation, and laser pulsing produces the desired image, generally on a raster or vector basis. In this third type of machine, both the laser and workpiece are stationary and galvanometer (galvo) mirrors move the laser beam over the workpiece surface. Laser etching machines according to these general types are available commercially from LasX Industries, Inc.

The point where the laser touches the surface is typically the focal plane of the laser's optical system, and is usually synonymous with its focal point. This point is typically small, perhaps less than a fraction of a millimeter, and dependent upon the optics and field size of the laser. The area inside this focal point and often immediately surrounding this focal point (referred to as the heat affected zone) is significantly affected when the laser beam passes over the surface. The energy delivered by the laser changes the surface of the material under the focal point. It may heat up the surface and subsequently vaporize the material, or perhaps the material may fracture (known as "glass" or "glass up") and flake off the surface. This is how material is removed from the surface to create an etching. If the surface material is vaporized during laser etching, ventilation through the use of blowers or a vacuum pump are often used to remove the noxious fumes and smoke arising from the process and for removal of debris on the surface to allow the laser to continue etching. A laser can remove material very efficiently because the laser beam can be designed to deliver energy to the surface in a manner which converts a high percentage of the light energy into heat. The beam is highly focused and collimated—in most non-reflective materials like wood, plastics and enamel surfaces, the conversion of light energy to heat is substantial. However, the equipment used in laser engraving may heat up rather quickly. Cooling systems are often used with the laser. Alternatively, the laser beam may be pulsed to decrease the amount of excessive heating. The laser scan speed determines throughput of the process or the rate at which the substrates such as building components are lazed with the desired graphic.

Different patterns can be etched by programming the controller to traverse a particular path for the laser beam over time. The trace of the laser beam is carefully regulated to achieve a desired removal depth of material. For example, crisscrossed paths are generally avoided to ensure that each etched surface is exposed to the laser only once, and so the same amount of material is removed. The speed at which the beam moves across the material is also considered in creating etching patterns. Changing the intensity and spread of the beam allows more flexibility in the design. For example, by changing the proportion of time (known as "duty-cycle") the laser is turned on during each pulse, the power delivered to the etching surface can be controlled appropriately for the material. Changing the power on the fly or the duty cycle on the fly allows for the creation of unique designs where the intensity of the graphic can change along each laser etched line as well as along individual sections of the graphic.

FIG. 1 is a flowchart of a method for staggered laser etch lines according to an embodiment of the invention. Articles that may be subject to marking according to the present invention include synthetic building components intended to replicate natural wood. Especially contemplated are exterior entry doors and interior passage doors, decks and deck components, siding, paneling, furniture components, etc., whether of solid construction or so-called hollow core doors constructed from a peripheral door frame with opposite door skins. Peripheral door frames include stiles and rails which define the sides and top and bottom of the door. A pair of door skins have interior surfaces secured to opposite sides of the peripheral door frame via bonding, mechanical fasteners, etc., and opposite exterior surfaces. As known in the art, hollow core doors may include additional support members and/or core materials (e.g., foam) disposed between the skins.

Other building components that may be subject to the exemplary methods and systems described herein include furniture and cabinet doors, closet and bifold doors, door trim, window frames, furniture elements, cabinetry, picture frames, tables, molded wall paneling, wainscot, decking, wall panels, siding, railings, window trim, architectural trim, flooring, etc. For explanatory purposes, exemplary embodiments below are described in relation to building components, in particular door structures. It should be understood that the methods and systems described herein may be used for marking other building component and articles other than building components.

The exemplary embodiments and methods described herein are particularly intended for use with engineered composite materials such as medium density fiberboard (MDF) and high density hardboard. Engineered composite materials generally contain cellulosic fibers or other particles, often broken down in a defibrator, and a resin and optionally wax, which are compressed at high temperatures and pressures. The cellulosic fibers/particles often constitute more than 90 weight percent of the material. The cellulosic component typically but not necessarily is wood fiber. The binding resin is typically a thermoset. An example of an engineered composite material is disclosed in U.S. Pat. No. 5,344,484. Examples of other materials that may be treated using the systems and methods embodied herein include fiberglass-reinforced sheet molding compound (SMC) polyesters, paints and basecoats on substrates, polymer sheets, veneers, papers, and natural materials, e.g. wood.

As shown in FIG. 1, the method 100 begins with laser engraving a first plurality of lines associated with a first component section of a graphic 102. A laser engraved graphic typically consists of multiple lines laser etched on a surface. Together, in aggregate, the plurality of etched lines can reproduce the overall appearance, or effect, of the graphic.

Next, the method 100 continues with laser engraving a second plurality of lines associated with a second component section of a graphic 104. A graphic may be divided into two or more component sections. For example, in order to etch a graphic greater in at least one dimension than the field size of a laser, than multiple component sections can be used to etch the graphic on the surface of an article. One or more lasers may laser engrave the first plurality of lines and/or the second plurality of lines.

Various techniques may be used to align the multiple component sections to provide a high quality image. In one embodiment, after a first section of the graphic is laser engraved, a position of the laser engraved first section is indexed, and the second section of the graphic is laser engraved beginning at the indexed position. In another embodiment, after a first component section of the graphic is laser engraved, the laser scanning head is moved to a location adjacent to the laser engraved first component section, Finally, the method 100 concludes by controlling said laser engraving of the first plurality of lines and said laser engraving of second plurality of lines to reduce the visual impact of a demarcation line separating the first component section of the graphic and the second component section of the graphic 106.

The laser engraving of the first plurality of lines and the laser engraving of the second plurality of lines can be controlled in one or a combination of ways to reduce the visual impact of the demarcation line. In one embodiment, controlling comprises staggering said first plurality of lines with said second plurality of lines by adjusting the lengths of said first plurality of lines and said second plurality of lines. By staggering the first component section and the second component section, the demarcation line can take on a more curvilinear shape, as opposed to the straight line of a non-staggered application of the graphic. A more curvilinear demarcation line may reduce the visual impact of the demarcation line, and thus creating a higher quality product.

Controlling the laser engraving of the first plurality of lines and the laser engraving of the second plurality of lines can also include randomizing the laser engraving of at least one of said first plurality of lines and said second plurality of lines by partitioning said lines into a random number of random length sub-unit lengths, controlling the line per inch density of said first plurality of lines and said second plurality of lines, and/or controlling the laser power of the laser engraving of the first plurality of lines and the second plurality of lines.

Figure 2:
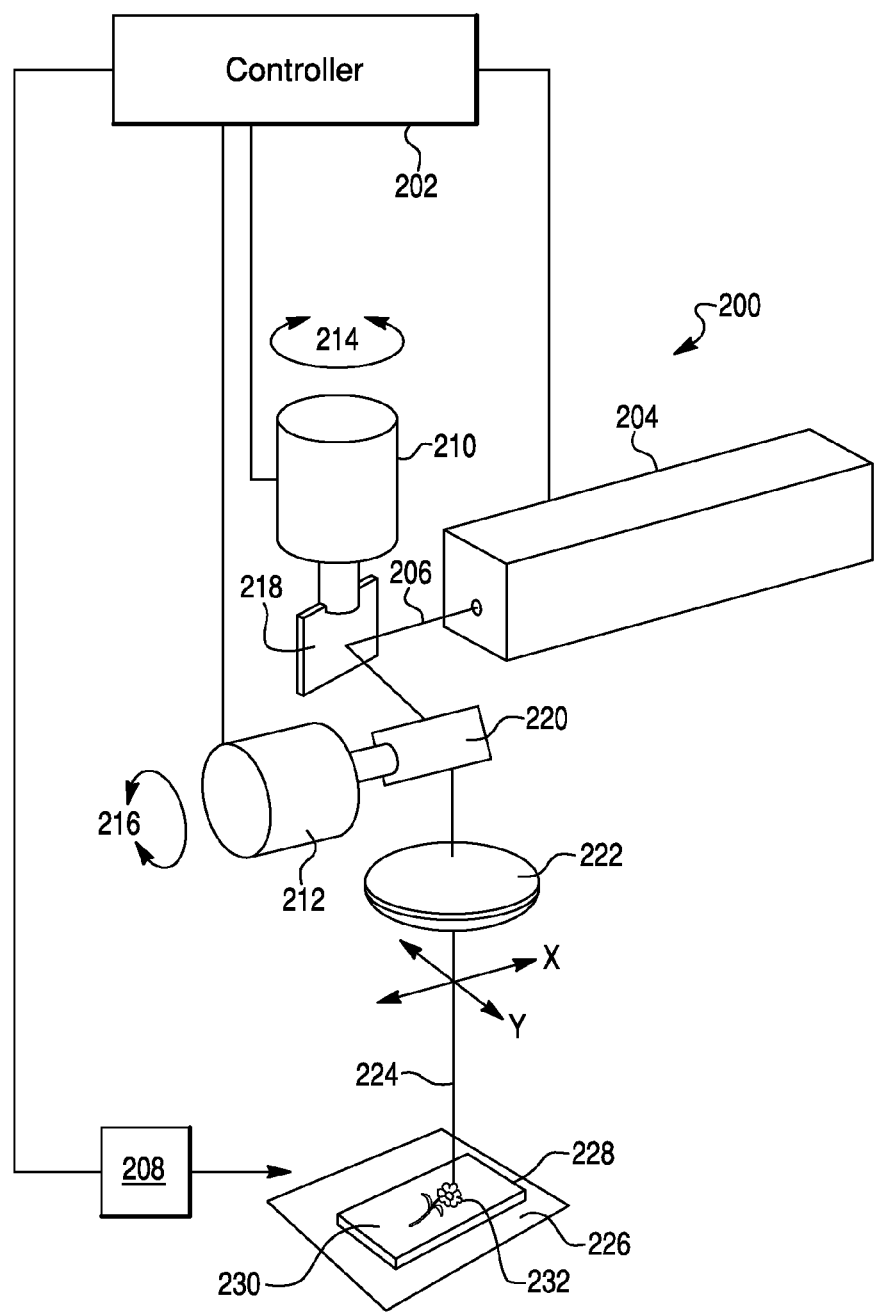
FIG. 2 is a schematic view of a system for staggered laser etch lines according to another embodiment of the invention.

FIG. 2 is a schematic view of a system for staggered laser etch lines according to another embodiment of the invention. As shown in FIG. 2, the system 200 is configured to laser etch graphics onto a surface. The system 200 comprises a controller 202 in communication with the laser 204 and gas tank 208.

The laser 204 generates a laser beam 206. The laser beam 206 output from the laser 204 may be adjusted from 500 watts up to 2,500 watts or more. The laser beam 206 may be directed and/or manipulated by x-axis mirror 218 and/or y-axis minor 220. An x-axis galvanometer 210 is in communication with x-axis mirror 218, and can rotate x-axis mirror 218 in the direction of 214 to direct the laser beam 206 along the x-axis. As the x-axis mirror 218 is rotated, laser beam 206 may be directed along the x-axis. Similarly, a y-axis galvanometer 212 is in communication with the y-axis mirror 220, and can rotate y-axis mirror 220 to further direct laser beam 206. As the y-axis mirror 220 is rotated, laser beam 206 may be directed along the y-axis. The controller 202 can be configured to control the x-axis galvanometer 210 and the y-axis galvanometer 212 by manipulating the power provided to each galvanometer 210, 212.

After the laser beam 206 is directed by the x-axis minor 218 and the y-axis mirror 220, the laser beam 206 travels through a focusing lens 222. The focusing lens can be configured to focus the laser beam 206 into a directed laser beam 224 onto a surface 230 of a workpiece 228. The focusing lens 222 may be a multi-spot on a flat plane as the laser beam 206 moves across the workpiece 228 to scribe a graphic. One or more of the focusing lens 222, x-axis galvanometer 210, y-axis galvanometer 212, x-axis minor 218 and/or y-axis mirror 220 can be housed in a galvanometer block (not shown).

The system 200 further comprises a working surface 226. Working surface 226 may comprise a solid substrate such as a table, or even a fluidized bed. One or more workpieces 228 to be laser etched are placed on the working surface 226. The workpiece 228 includes a surface 230 for laser-etching and/or printing.

The position of the workpiece 228 and the surface of the workpiece 230 may be adjusted in a variety of ways. The working surface 226 may move vertically to adjust the distance from the focusing lens 222 to the workpiece surface 230. The working surface 226 may comprise a conveyer belt capable of horizontal movement.

As the x-axis mirror 218 and the y-axis mirror 220 move, or rotate, the focused laser beam 224 is directed across the surface 230 of the workpiece. In some embodiments, the focused laser beam 224 hits the surface 230 of the workpiece 228 at a perpendicular, i.e. 90° angle. Variations in the laser-markings on the surface 230 may be achieved by adjusting the angle of incidence of the focused laser beam 224 on the surface 230, such as between angles of about 45° to about 135°.

As the focused laser beam 224 contacts and moves about the surface 230 of the workpiece, a graphic 232 is laser-etched onto the surface 230. The movements and timing of the mirrors 218, 220 and the power of the laser beam 206 can be controlled by the control computer 202 to laser-etch a specific graphic 232. As referred to herein, relative movement may involve movement of the focused laser beam 224 (e.g., using the mirror system) as the workpiece 228 remains stationary, movement of the workpiece 228 while the directed laser beam 224 remains stationary, or a combination of simultaneous movement of the laser beam 224 and the workpiece 228 in different directions and/or at different speeds.

The control computer 202 and/or a second computer (not shown in FIG. 2) may be used to form a desired graphic. For example, a graphic can be scanned into a second computer, converted into the proper format, and then communicated to the control computer 202. The control computer then controls the galvanometers 210, 212, mirrors 218, 220, and the power output of the laser 206 to form the graphic 232 on the surface 230 of the workpiece 228.

The system 200 can also include a tank 208 to inject a gas such as an inert gas into the working zone. The amount of gas can be controlled by the numerical control computer or by other means. The power and speeds should be controlled to effect the desired color change while avoiding undesirably consequences of over-treatment, such as complete carbonization, burn-through and/or melting of the workpiece 228.

Computer hardware and software for carrying out the embodiments of the invention described herein may be any kind, e.g., either general purpose, or some specific purpose such as a workstation. The computer may be a Pentium® or higher class computer, running an operating system such as Windows XP®, Windows Vista®, or Linux®, or may be a Macintosh® computer. The computer may also be a portable or mobile computer, such as a PDA, cell phone, or laptop. The programs may be written in source code, C, C plus, Java or any other programming language. The programs may be resident on a storage medium, e.g., magnetic or optical, of, e.g., the computer hard drive, a removable disk or media such as a memory stick or SD media, or other removable medium. The programs may also be run over a network, for example, with a server or other machine sending signals to one or more local machines, which allows the local machine(s) to carry out the operations described herein.

In the course of marking and scribing, the laser beam 224 applies heat to the plastic composite working surface of the substrate, thereby causing a visually perceptible change to the substrate surface, such as by causing removal, ablation, or etching of a coating of the substrate, removal, ablation or etching of substrate material, transformation of a dye such as by dye removal or alteration of the color of the dye, etc. The result is a visually-perceptible graphic marking on or in the substrate. The term graphic refers to decorative and artistic designs, non-decorative designs, patterns, graphic images, simulated wood grain, alpha-numeric characters, logos, other markings, etc. It should be understood that the methods and systems described herein may be used for marking/scribing materials other than plastic lumber or other building materials.

It should be understood that the present invention may be carried out using various other laser systems having alternative layouts and components to those shown in FIGS. 1 and 2, or as otherwise generally described above. The laser scanning system configuration can be pre-objective architecture where the laser beam is reflected from two scan mirrors and then directed through a focusing lens. Alternately, the laser scanning system architecture can be post-objective where the laser beam is first passed through the focusing lens and then reflected from the scan mirrors onto the work piece. Any number of optics and lenses can be introduced into either architecture. Examples of other such laser systems are disclosed in U.S. Patent Application Publication No. 2007/0108170, to Costin et al.

Other embodiments of the invention combine ink-jet printing with laser scribing. In certain exemplary embodiments of the invention a method is provided for marking the surface of an article in which a first graphic design element is laser scribed into the article surface, and a second graphic design element is printed on the surface of the article. The first and second graphic design elements are applied to the article surface in registry with one another so that the overall graphic design is a cooperative interaction between the lased and printed elements. Spatially, registering the first and second graphic elements may involve their superimposition or juxtaposition on the article surface using, for example, predetermined coordinates. Aesthetically, the lased and printed graphic design elements produce a synergistic effect that in exemplary embodiments is manifested as a high quality simulation of natural materials that could not be attained by either laser marking or printing without the other. In certain exemplary embodiments the first and second graphic design elements may also produce a textural contrast as discussed below. Laser scribing and printing may be conducted in any order or simultaneously, although preferably the substrate is lazed first and ink-jet printed second.

FIG. 3A is a schematic view of a system for staggered laser etch lines according to another embodiment of the invention. Articles according to the invention may be marked using a high-speed high power laser system 300 such as shown in FIG. 3A. The laser 304 may be a high power laser, such as a $CO_2$ laser of at least 500 watts and up to 2500 watts or more. The output 306 of the laser 304 is coupled to a laser scanning head 308. The laser scanning head 308 includes a relatively light weight coated mirror that is capable receiving the output 306 generated by the laser 304 and generating a directed laser beam 324 at a relatively high speed. The directed laser output 324 can be scanned across the work piece 330 on working surface 326. The workpiece 330 may comprise a plastic lumber building component or some other material.

As shown in FIG. 3A, the system 300a includes a controller 302. The controller 302 may store control information for controlling the laser before, during, and/or after the laser engraving process. The control information may be linked to one or many different graphics, such as a wood grain pattern, or a floral pattern 332. The controller 302 is capable of keeping up with the high scan speeds of the laser scanning head 308 produced by the lightweight mirrors and able to make the necessary power changes at the specified speed. To create fine resolution graphics, the controller 302 can make such power changes at high rates, such as 10,000 to 50,000 power changes per second. The type (e.g., complexity and intricacy) and depth of the graphic will also influence how it is scribed on the substrate.

Figure 3B:
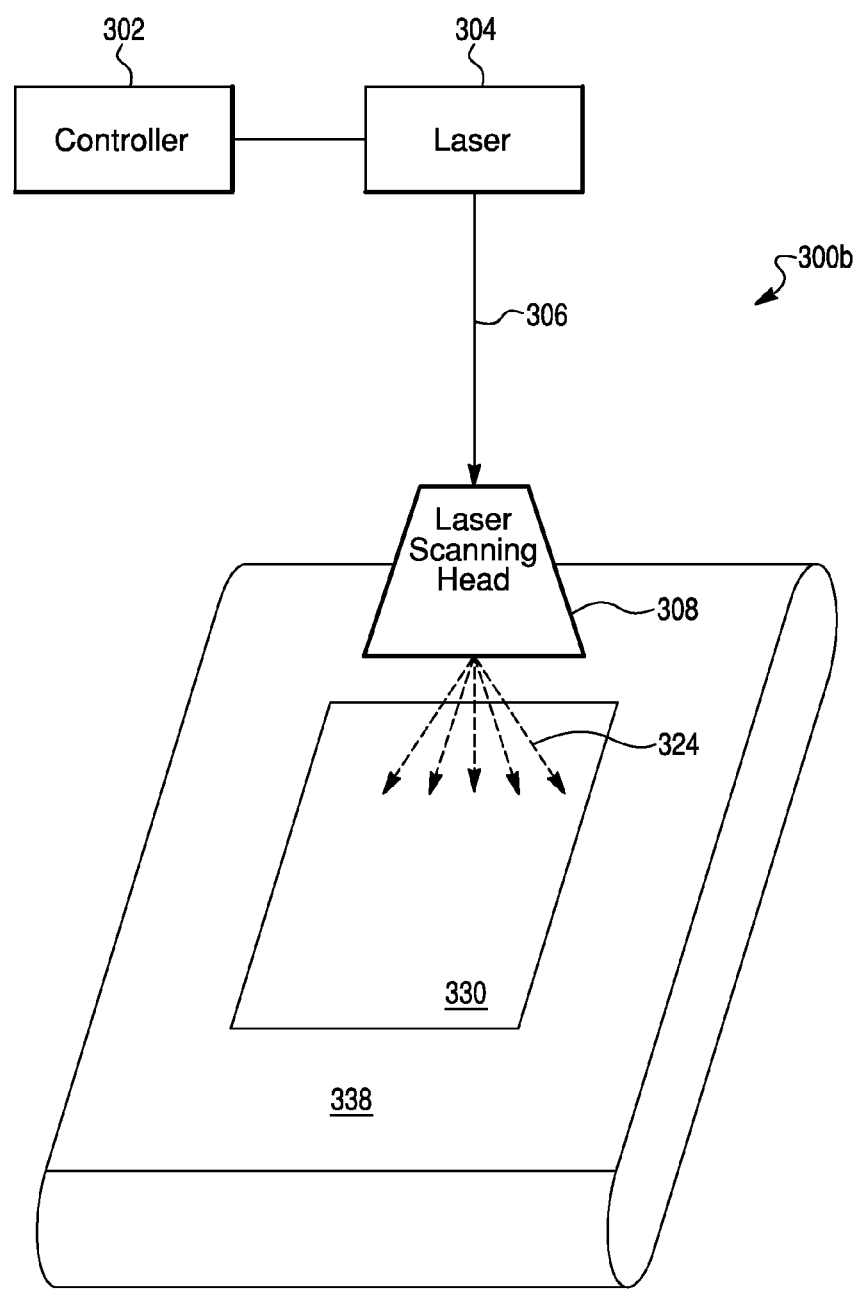
FIG. 3B is a schematic view of a system for scribing staggered laser etch lines in a continuous "print-on-the-fly" process according to another embodiment of the invention.

FIG. 3B is a schematic view of a system for scribing staggered laser etch lines in a continuous "print-on-the-fly" process according to another embodiment of the invention. As shown in FIG. 3B, the system 300b comprises a conveyer apparatus 338. The conveyer apparatus 338 can move, or convey the work piece 330 under the directed laser 324. The speed of the conveyor apparatus 338 may be fixed, or predetermined. Or, the controller 302 may continuously set and maintain the proper speed of the conveyer apparatus to assure accurate registration of the component sections that collectively comprise the graphic being applied. In one embodiment, the conveyor apparatus 338 is a roller based table where the workpiece is pulled along the conveyor by means of a nip roll system.

FIG. 3C is a schematic view of a system for staggered laser etch lines where multiple lasers are utilized to create the graphic according to another embodiment of the invention. As shown in FIG. 3C, the system 300c comprises a plurality of lasers 304a, 304b. One or more laser controllers 302 (not shown in FIG. 3C) may control the plurality of lasers 304a, 304b. A plurality of laser scanning heads 308a, 308b are in communication with the plurality of lasers 304a, 304b, and laser engrave graphics onto the article 330 by generating directed laser beams 324a, 324b. While each laser 304a, 304b may have its own controller, a single master controller may control all lasers 304a, 304b, or control individual controllers. By using multiple lasers, each laser 304a, 304b may apply a component section, or portion, of the graphic. In order to assure a unitary, uniform composite image, each component section may be in registration.

Figure 3D:
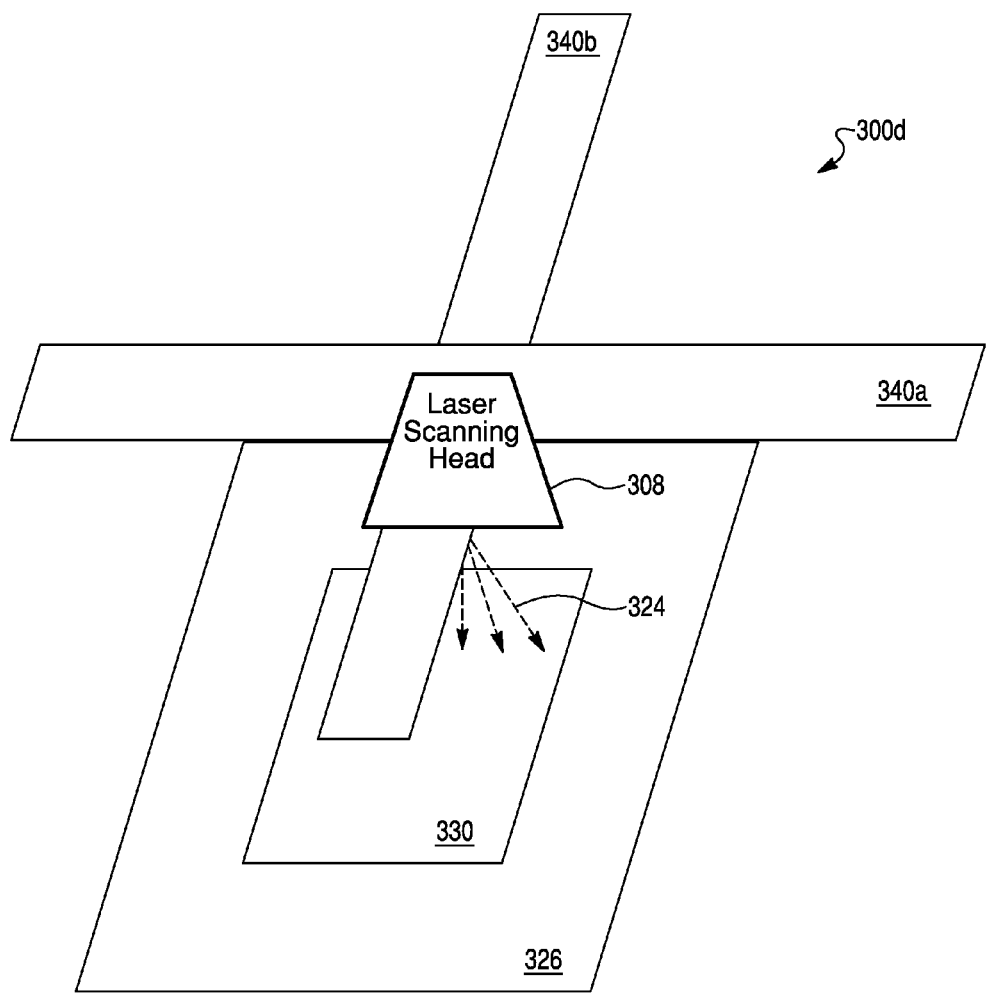
FIG. 3D is a schematic view of a system for staggered laser etch lines where the laser scan head is moved according to another embodiment of the invention.

FIG. 3D is a schematic view of a system for staggered laser etch lines where the laser scan head is moved according to another embodiment of the invention. As shown in FIG. 3D, the system 300d comprises laser scanning head 308 operably connected to a first track 340a and a second track 340b. The laser scanning head 308 can move along the tracks 340a, 340b so that the work piece 330 may remain stationary on the support apparatus 326. The laser scanning head 308 may be carried on a rail, track, robot arm or similar system to allow the laser scan head 308 to move along the work piece 330 as it applies the graphic in portions onto the work piece. A plurality of component sections of the graphic applied by the laser scanning head 308 may be in registration to assure a unitary and uniform graphic applied to the work piece.

It should be understood that the present invention may be carried out using various other laser systems having alternative layouts and components to those shown in FIGS. 2 and 3A-3E, or as otherwise generally described above. It should be understood that methods of the present invention may be carried out using various other laser systems, such as the laser system disclosed in U.S. Patent Application Publication No. 2007/0108170, to Costin et al.

Other embodiments of the invention may combine ink-jet printing with laser scribing. In certain exemplary embodiments of the invention a method is provided for marking the surface of an article in which a first graphic design element is laser scribed into the article surface, and a second graphic design element is printed on the surface of the article. The first and second graphic design elements are applied to the article surface in registry with one another so that the overall graphic design is a cooperative interaction between the lased and printed elements. Spatially, registering the first and second graphic elements may involve their superimposition or juxtaposition on the article surface using, for example, predetermined coordinates. Aesthetically, the lased and printed graphic design elements produce a synergistic effect that in exemplary embodiments is manifested as a high quality simulation of natural materials that could not be attained by either laser marking or printing without the other. In certain exemplary embodiments the first and second graphic design elements may also produce a textural contrast as discussed below. Laser scribing and printing may be conducted in any order or simultaneously, although preferably the substrate first is lazed and then ink jet printed.

Figure 3E:
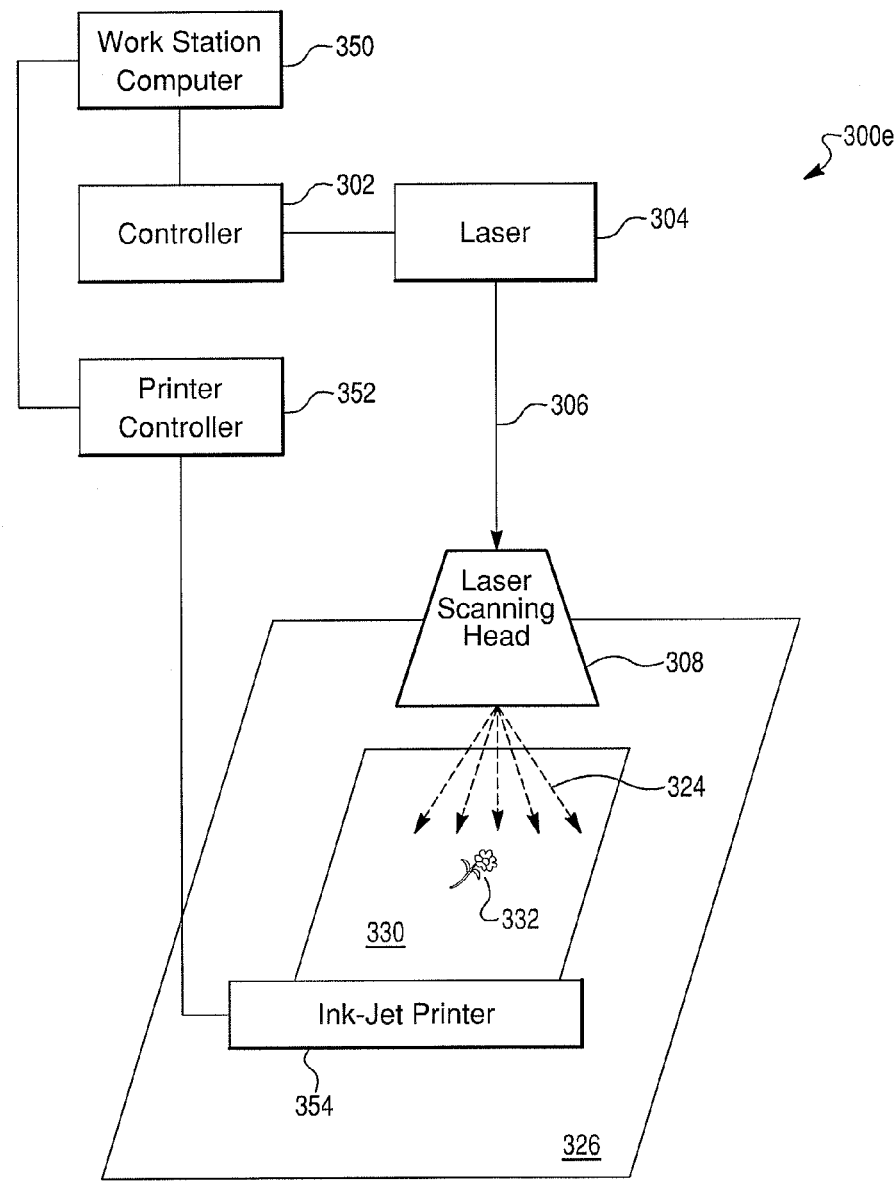
FIG. 3E is a schematic view of a system for surfacing making an article with both a laser and a printer according to another embodiment of the invention.
Figure 4:
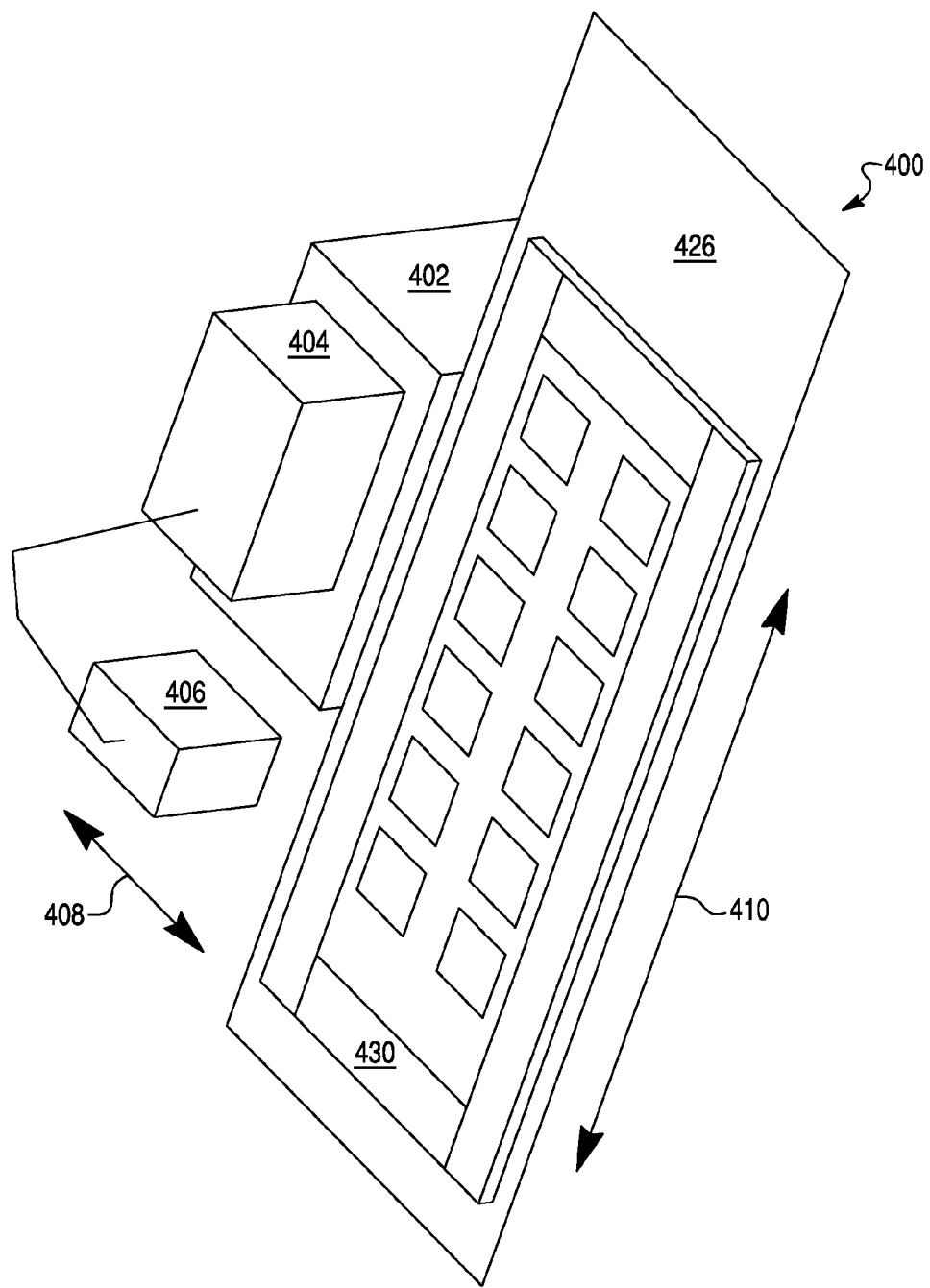
FIG. 4 is a schematic view of a printing station for staggered laser etch lines according to another embodiment of the invention.

A system for laser scribing and ink printing graphic design on articles such as building components using a high-speed high power laser and ink jet printer is shown in FIGS. 3E, 4, and 5. It should be understood that the elements of the system described below are exemplary and are not necessarily intended to be limiting on the scope of the invention. Other systems and apparatus may be substituted for those described below, and the system and apparatus described below may be modified as dictated by the nature of the graphic pattern and the article.

FIG. 3E is a schematic view of a system for surfacing making an article with both a laser and a printer according to another embodiment of the invention. As shown in FIG. 3E, a system 300e comprises a work station computer 350. The work station computer 350 may be accessed by an operator, and receive input specifying one or more parameters related to a graphic to be laser engraved on an article. For example, a user may specify a specific graphic to be laser engraved on the surface of the article, along with a speed and a quality level. The work station computer 350 is in operative communication with the controller 302 and a printer controller 352. The controller 302 is in communication with the laser 304 and the laser scanning head 308 to direct the output of the laser 306. The printer controller 352 communicates with an ink-jet printing apparatus 354.

FIG. 4 is a schematic view of a printing station for staggered laser etch lines according to another embodiment of the invention. As shown in FIG. 4, the system 400 comprises a printing station 402. The printing station 402 includes an ink-jet printer 404 with at least one ink jet print head 406. The ink-jet print head 406 is mounted for horizontal movement in the direction of arrow 408, which is perpendicular to the direction of movement of the article 430 on the working surface 426, indicated by arrow 410. The ink jet print head 406 may move in the direction 408 across the entire width of the door structure 430. The printer 402 may be a flat bed printer, such as available through Inca Digital Printers Limited of Cambridge, United Kingdom.

FIG. 5 is a schematic view of a printer applying ink and laser scribing to an article having a channel feature according to another embodiment of the invention. As shown in FIG. 5, a printer 500 is configured to print on a surface of an article 514. The printer 500 may include a rail 502 for supporting the print head 504. The rail 502 provides for lateral movement of the print head 504 under the control of the print controller 506. The print head 504 is shown with a UV curing lamp 508 for drying and curing the ink jet ink. Alternatively, a separate curing station (not shown) may be provided. Ink jet ink droplets 510 are emitted from one or more nozzles 512 of the print head 504.

It should be understood that the printer 500 may include multiple print heads 506 arranged in rows or arrays, so that each pass may effective print in more than one set of print grid positions. The nozzles 510 may emit droplets 510 of various desired colors in order to create a desired color. While the printing apparatus 500 described above is an ink jet printer, it should be understood that other printer types, such as laser printers, may be used.

An object of the invention is to reduce or eliminate the visual impact, i.e. visual perceptibility, of a demarcation line at the border between two adjoining component sections of a graphic which is laser engraved onto the surface of an article. This object is accomplished by controlling the laser engraving of the adjoining component sections, such as by staggering and/or randomizing the laser engraved lines associated with the two component sections. Staggering occurs at the border between the two component sections. Randomization of laser etched line sub-length occurs within each individual laser etched line in a component section within which it occurs. The concept can incorporate both staggering and the randomizing of the sub-lengths of the laser etch lines from one or both component sections with those from an adjoining component section.

Figure 6A:
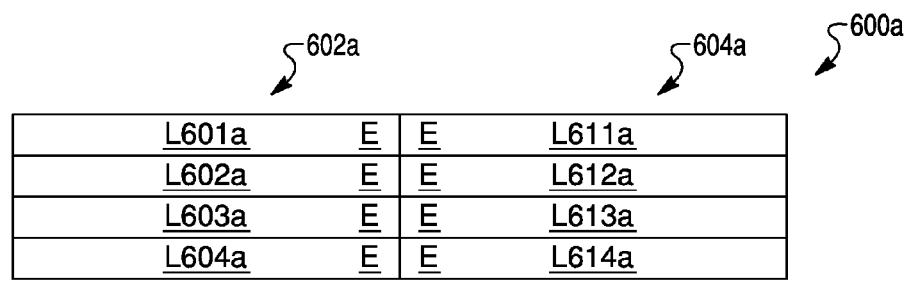
FIG. 6A is an illustration of non-staggered laser etch lines.
Figure 6B:
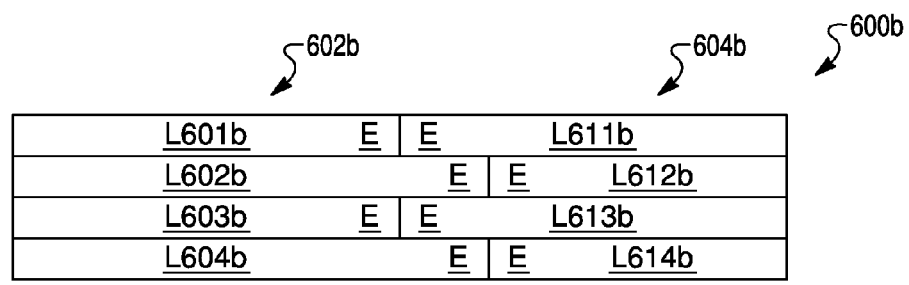
FIG. 6B is an illustration of staggered laser etch lines according to another embodiment of the invention.
Figure 6C:
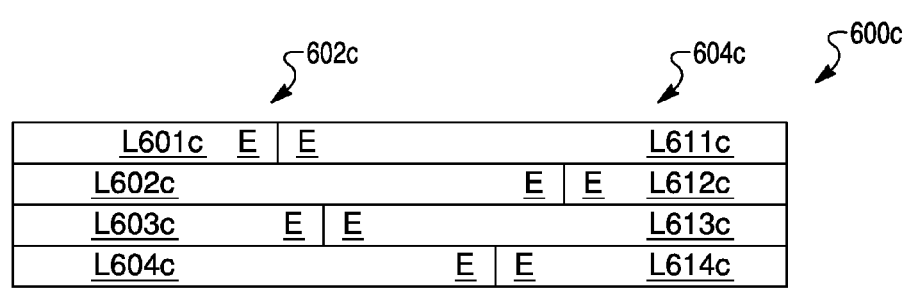
FIG. 6C is an illustration of staggered laser etch lines according to another embodiment of the invention.

FIGS. 6A, 6B, and 6C provide a simplified representation of the concepts of randomizing and staggering according to the invention. FIGS. 6A, 6B, and 6C all illustrate a graphic made by laser-engraving a substrate or an article surface. In each of FIGS. 6A, 6B, and 6C, two component sections are shown, with a first component section 602a, 602b, 602c and a second component section 604a, 604b, 604c. Each component section of the FIGS. 6A-6C share a border represented by lines E. In each component section there are four laser engraved lines from top to bottom. Each first component section comprises laser engraved lines L601, L602, L603 and L604. Each second component section comprises laser engraved lines L611, L612, L613, and L614. Each laser engraved line has an endpoint, E, where a laser engraved line from either component sections meets the corresponding laser engraved line of the other component section at the border.

FIG. 6A is an illustration of non-staggered laser etch lines according to an embodiment of the invention. As shown in FIG. 6A, a graphic comprises a first component section 602a and a second component section 604a. The first component section 602a comprises a first plurality of laser engraved lines L601A-L604a. The second component section 604a comprises a second plurality of laser engraved lines L611a-L614a. Neither the lengths of the first plurality of lines L601a-604a or the lengths of the second plurality of lines L611a-L614a have been adjusted. Accordingly, the endpoints E of each laser engraved line up in a straight demarcation line, or border.

Conventional methods of laser engraving a graphic 600a do not stagger laser engraved lines, and result in a highly perceptible demarcation line, i.e. a demarcation line with a high visual impact. Consumers examining articles produced by laser engraving graphics with no staggering may immediately spot the line of demarcation, even from a distance, due to its high visual impact.

FIG. 6B is an illustration of staggered laser etch lines according to another embodiment of the invention. As shown in FIG. 6B, the graphic 600b comprises a first component section 602b and a second component section 604b. The first plurality of lines L601b-L604b and the second plurality of lines L611b-L614b are staggered, as illustrated by the shifting border lines E. The staggering shown in FIG. 6B may represent a low amount of staggering, i.e. adjusting the lengths of each of the plurality of laser engraved lines up to 10%.

At the low staggering illustrated in FIG. 6B, the individual laser engraved lines join at staggered locations, i.e. in a curvilinear line. Because of the staggered lengths and the resulting curvilinear demarcation line, the visual impact of the demarcation line is reduced compared to the visual impact of the demarcation line of a non-staggered graphic such as 600a. The demarcation at the borders between each laser engraved line is less obvious, or perceptible, because the demarcation is dispersed.

FIG. 6C is an illustration of staggered laser etch lines according to another embodiment of the invention. The graphic 600c comprises a graphic with a high amount of staggering, i.e. with the lengths of the each plurality of laser engraved lines adjusted up to 50%. As shown by the high staggering in FIG. 6C, the demarcation line is spread over a larger area than the low staggering in FIG. 6B, or the non staggering in FIG. 6A. From a distance, the demarcation line of a graphic 600c with high staggering, in effect, disappears, and thus has zero visual impact.

The amount of staggering of the laser engraved lines may vary from zero staggering up to 50% of the length of the laser engraved lines, such as 10%, 12%, 17%, 25%, 40%, 50%, etc. In one embodiment of the invention, the level of staggering among the individual lines varies randomly, or has no perceivable pattern, between zero staggering and maximum staggering. A highly randomized amount of staggering may be preferable so that the lengths of the laser engraved lines have a high degree of variation, and the resulting demarcation line is highly curvilinear.

In some embodiments of the invention, the degree of staggering of each laser line is controlled. The degree of staggering from the border center point can be changed from very little to very large, i.e. from 0% to 50%. The degree of staggering and staggering randomization is set through programming controls that automate application of the graphic design from a raster or vector file. The major advantage to adding a staggering effect to each component section is to prevent or reduce the visual perceptibility of any lines of demarcation from areas where the lines from one component section of the graphic meet to another component section.

The visual impact of the demarcation line may also be controlled through other methods. For example, control or manipulation of laser power, laser scan speed, laser frequency, process control factors, and line density of graphic laser lines per inch (i.e., LPI) may be combined with staggered to further reduce the visual impact of the demarcation line. Combinations of these methods and factors in applying detailed wood grain graphic designs has yielded novel and surprising results in removing or lowering the perceptibility of any demarcation line between component sections when the wood grain graphic was laser scribed to the surface of a plastic lumber article.

FIG. 7 is a schematic view of a graphic image that is composed of a series of discontinuous lines, as may be the case for some low density wood grain images, in which case individual graphic sections that make up the unitary graphic image may be divided into two parts by an adjoining line that is curvilinear. As shown in FIG. 7, an article surface 700 comprises a first component section of a graphic 702 and a second component section of a graphic 704 separated by a demarcation line 706.

The first component section of the graphic 702 comprises a first plurality of laser engraved lines L701, L702, L703, L704, L705, L706, L707 and L708. The second component section of the graphic 704 comprises a second plurality of laser engraved lines L711, L712, L713, L714, L715, L716, L717 and L718. The line of demarcation 706 represents an area (i.e. a border) between the first component section 702 and the second component section 704. As shown in FIG. 7, the line of demarcation is a curvilinear section, or line.

As shown in FIG. 7, the first plurality of laser engraved lines L701-708 are staggered with the second plurality of laser engraved lines L711-L718, as the lengths of the first plurality of laser engraved lines L701-L708 and the lengths of the second plurality of laser engraved lines L711-L718 have been adjusted.

Figure 8:
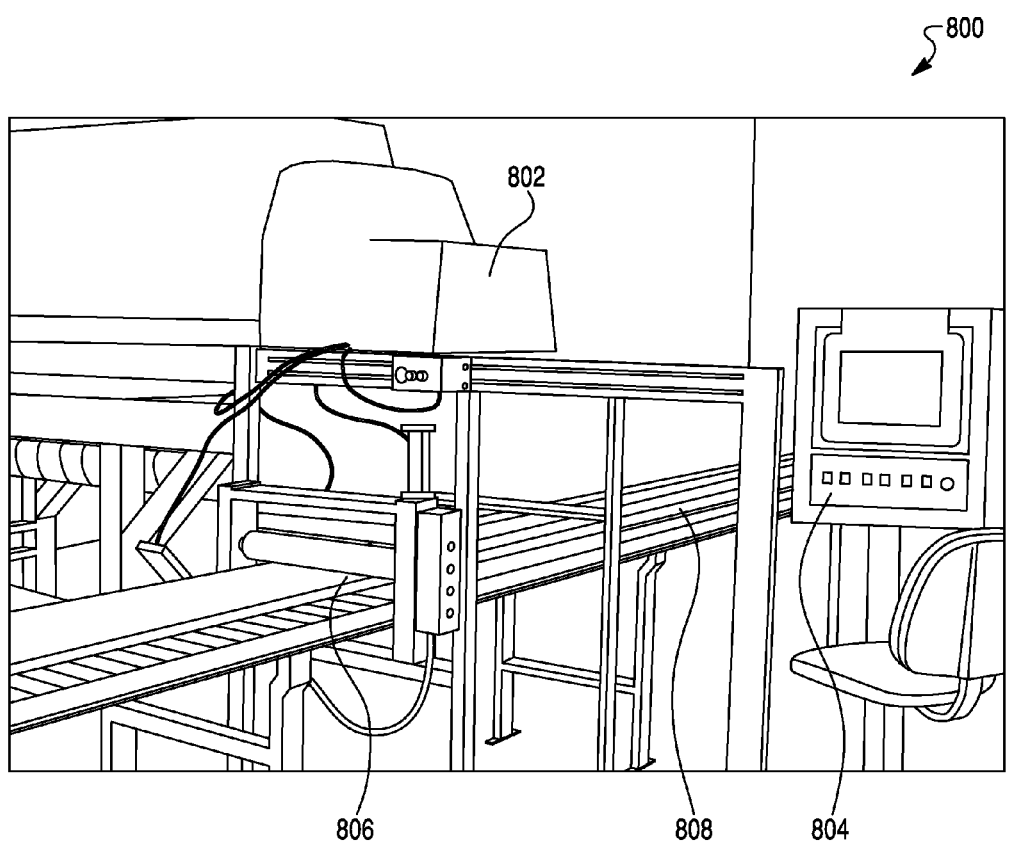
FIG. 8 is an illustration of a system for staggered laser etch lines according to another embodiment of the invention.

FIG. 8 is an illustration of a system for staggered laser etch lines according to another embodiment of the invention. As shown in FIG. 8, the system 800 may comprise a nip roll system. The system 800 comprises a laser engraver 802 and a work station computer 804. Articles are fed into the system 800 via an input conveyor 806, and leave the system via an output conveyor 808.

Figure 9:
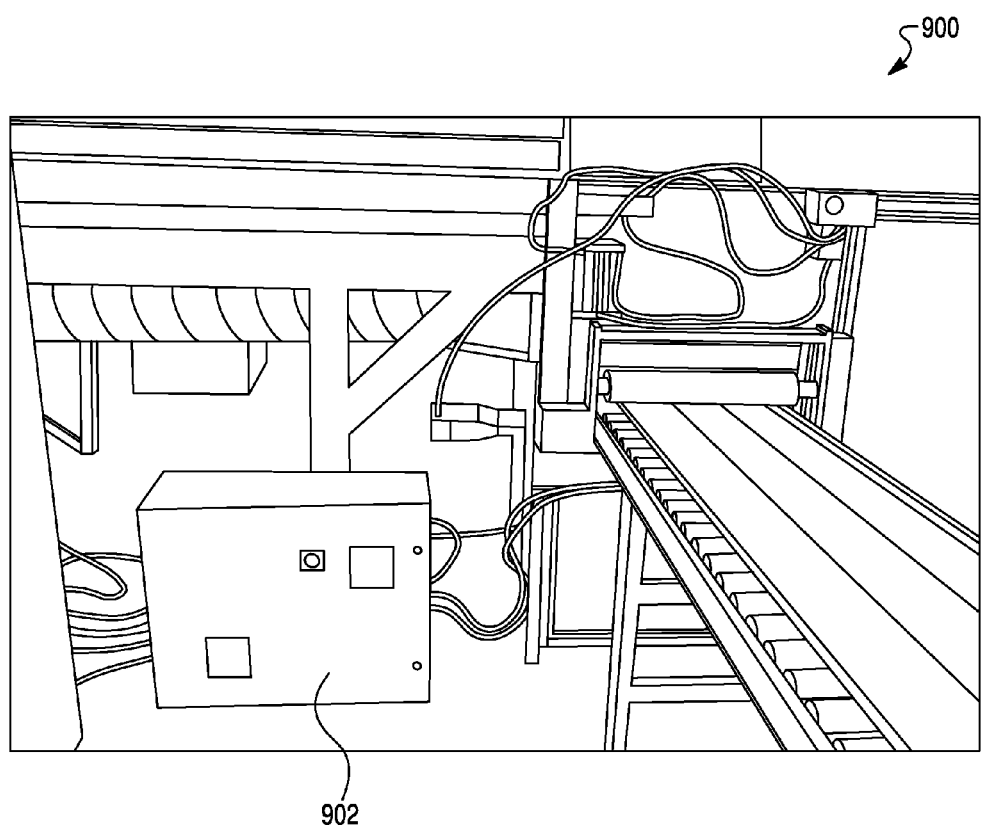
FIG. 9 is an illustration of a system for staggered laser etch lines according to another embodiment of the invention.

FIG. 9 is an illustration of a system for staggered laser etch lines according to another embodiment of the invention. As shown in FIG. 9, the system 900 includes a controller 902. The controller 902 is in communication with a laser (not shown in FIG. 9), and can control the process of laser engraving a graphic onto a surface of an article.

In one example, a wood grain pattern graphic 6 inches wide and 16 feet long is supplied in a digital format (i.e. a digital file) and imported into laser etch control program executed by the controller. Next, the controller formats the wood grain pattern graphic into a plurality of component sections to be laser engraved onto the surface of a piece of plastic lumber. A 12 foot long piece of plastic lumber may be divided into 24 six inch parts, in order to maximize throughput within a 20 inch field. Once the number of component sections is determined, the controller divides the wood grain pattern graphic into the calculated number of component sections. The resulting file may be saved as a job, and process parameters, such as laser speed, lines per inch, and laser power, are selected. Finally, the laser system is activated, and articles are fed into the system via a conveyer belt. The laser engraves the wood grain pattern graphic onto the surface of a moving article via a continuous "print-on-fly" process.

The grain of the wood grain pattern graphic flows along the length of the wood composite plastic lumber and therefore is generally laser etched in the same direction. The speed of the conveyer system can be adjusted depending upon the graphic and the speed of the laser beam. From a manufacturing and economical perspective, it may be preferred to immediately begin lazing the next article after the completion of the previous article.

Figure 10:
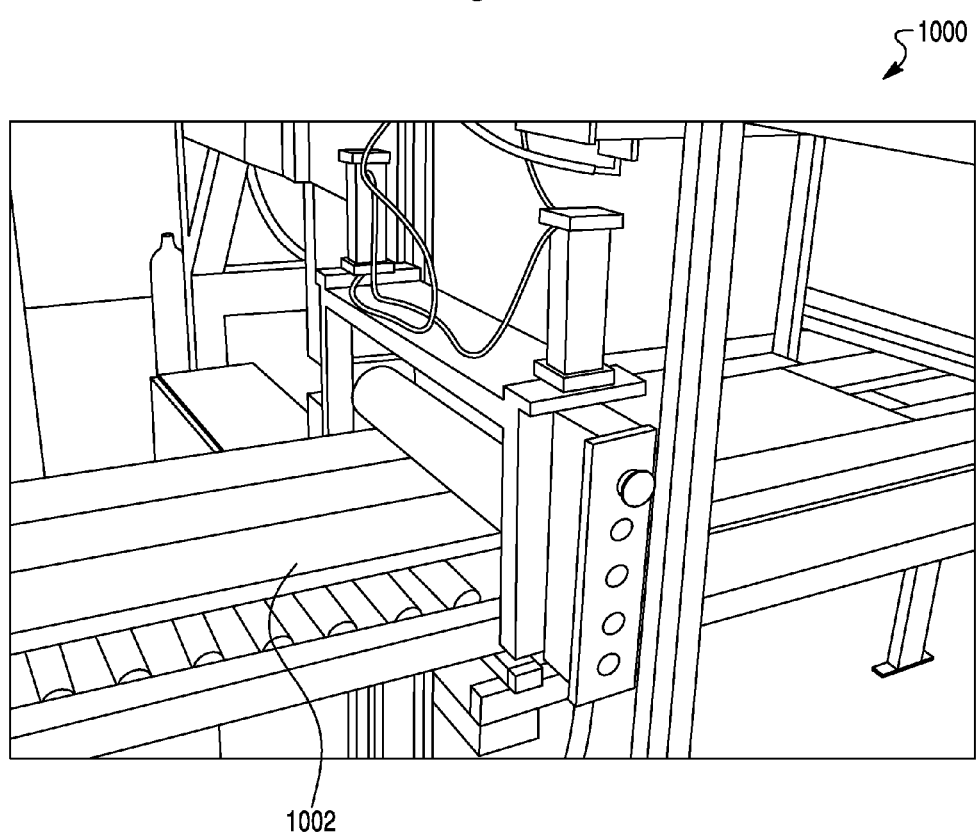
FIG. 10 is an illustration of a system for staggered laser etch lines according to another embodiment of the invention.

As shown in FIG. 10, a shuttle system may be used to reduce or eliminate any slight wobble or movement of the articles as they move through the system during continuously lazing. In this way, more accurate graphics can be engraved onto the surface of the article. One alternative method for preventing wobble, or movement of the article, comprises a frame 1002. The frame 1002 may be positioned along the input conveyor and extend through the work enclosure to the output conveyor. Articles to be laser engraved may be held in place by being positioned inside the frame, which also serves to constrain side-to-side movement of the article while it progresses through the system.

Various tests were conducted in order to determine the influence of a number of variables on the degree of perceptibility of the demarcation. These variables included the laser power, the lines per inch of the graphic, the speed of the laser beam and thus the conveyor speed, the boundary settings in graphics application software, and the percent staggering selected in the graphics application software. The parameters and results are summarized in Table I and described below.

TABLE I

Nip Roll Laser Trial Parameters

| FIG. # | Randomization | Laser Power (watts) | LPI (lines per inch) | Laser Scan Speed (meters per second) | Web fpm | Results |
|---|---|---|---|---|---|---|
| 11 | 0% | 2000 | 60 | 10 | 2.5 | Distinct Demarcation Lines |
| 12 | 10% | 1000 | 60 | 10 | 2.5 | Demarcation Lines Still Visible |
| 13 | 20% | 2000 | 60 | 10 | 0 | Demarcation Lines Obvious |
| 14 | 20% | 2000 | 60 | 10 | 2.5 | Demarcation Lines Obvious |
| 15 | 10% | 1000 | 60 | 10 | 2.5 | Demarcation Lines Obvious |

TABLE I-continued

Nip Roll Laser Trial Parameters

| FIG. # | Randomization | Laser Power (watts) | LPI (lines per inch) | Laser Scan Speed (meters per second) | Web fpm | Results |
|---|---|---|---|---|---|---|
| 16 | 10% | 2000 | 60 | 10 | 2.5 | Demarcation Lines Somewhat Masked |
| 17 | 10% | 1000 | 40 | 10 | 2.5 | Demarcation Lines Lighter |
| 18 | 50% | 2000 | 60 | 10 | 2.5 | Invisible Demarcation Lines |
| 19 | 50% | 1000 | 60 | 10 | 2.5 | Good (Low) Visibility of Demarcation Lines |
| 20 | 50% | 2375 | 60 | 15 | 5.5 | Good (Low) Visibility of Demarcation Lines |

Figure 11:
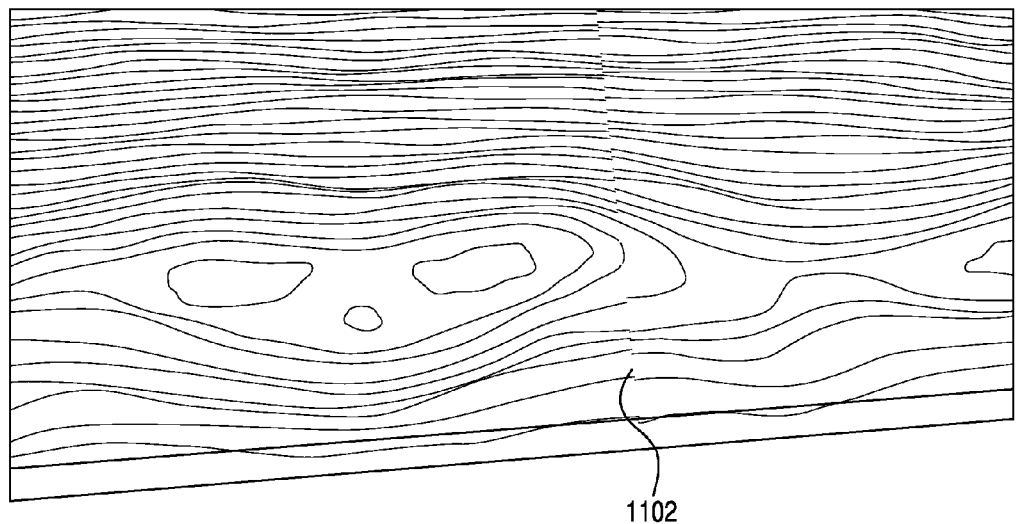
FIG. 11 is an illustration of a laser engraved article demonstrating a high visual impact of demarcation according to one embodiment of the invention.

FIG. 11 is an illustration of a laser engraved article demonstrating a high visual impact of demarcation according to one embodiment of the invention. As shown in FIG. 11, an initial laser scribing test run was performed without staggering or other randomization as a basis for comparison. The first set of data on laser etching wood grain patterns on a plastic lumber wood composite article produced poor results in that a clear line of demarcation could be seen at the intersection of each component section of the graphic. Every six inches along the length of the plastic lumber, a strong demarcation line 1102 was visually perceptible as shown in FIG. 11.

Figure 12:
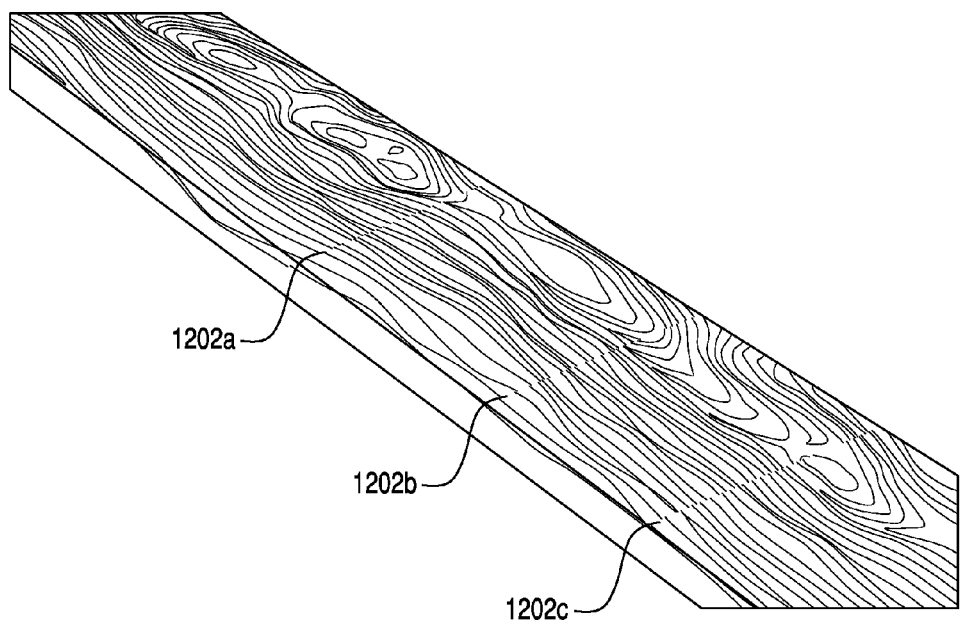
FIG. 12 is an illustration of a laser engraved article demonstrating visual impact of demarcation according to one embodiment of the invention.

FIG. 12 is an illustration of a laser engraved article demonstrating visual impact of demarcation according to one embodiment of the invention. As shown in FIG. 12, another run was prepared with the laser etched lines in the component sections of the wood grain graphic interlaced 10% produced unexpected and surprisingly improved results which showed demarcation lines 1202a, 1202b, 1202c with reduced visual impact as shown in FIG. 12.

Figure 13:
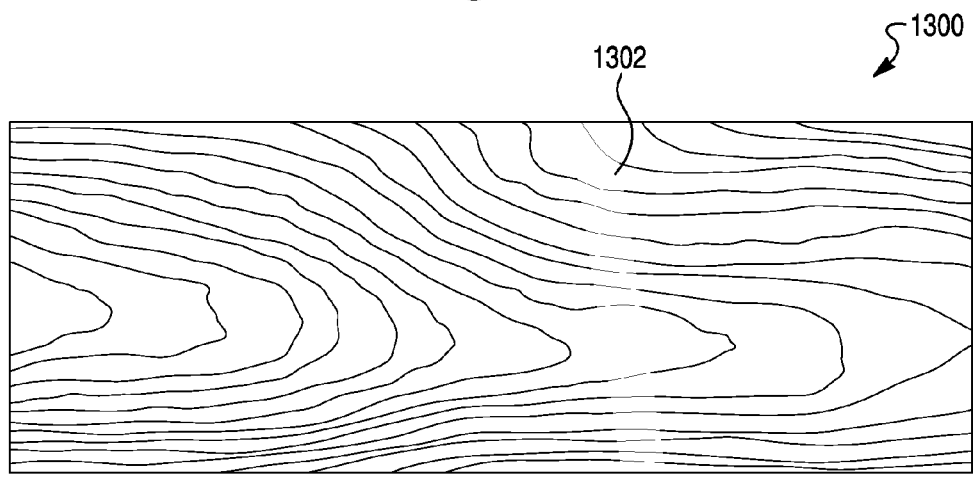
FIG. 13 is an illustration of a laser engraved article demonstrating visual impact of demarcation according to one embodiment of the invention.
Figure 14:
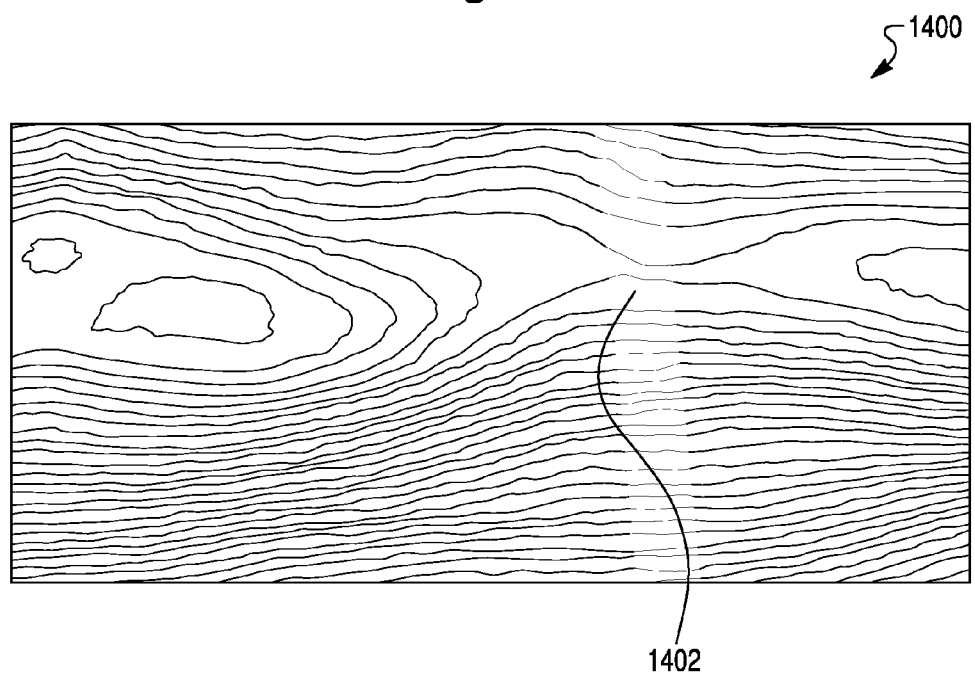
FIG. 14 is an illustration of a laser engraved article demonstrating visual impact of demarcation according to one embodiment of the invention.

FIGS. 13 and 14 are illustrations laser engraved articles demonstrating visual impact of demarcation according to embodiments of the invention. FIG. 13 illustrates a laser scribing test run with a moving laser and a stationary article, i.e. stationary lazing. FIG. 14 illustrates a laser scribing test run with a moving article. As shown in FIGS. 13-14, the demarcation line 1302 and demarcation line 1402 were still slightly perceptible when the laser etching was done on both the stationary article 1300 and the moving articles 1400. Because the demarcation line 1302 was still evident in the in the stationary product of FIG. 13, persisting demarcation may not be associated with the moving process or any associated side-to-side wobble of the plastic lumber as it moves through the laser scribing system. Therefore joining two laser etched sections either by moving the laser or by moving the part or by moving both generate this defect.

Figure 15:
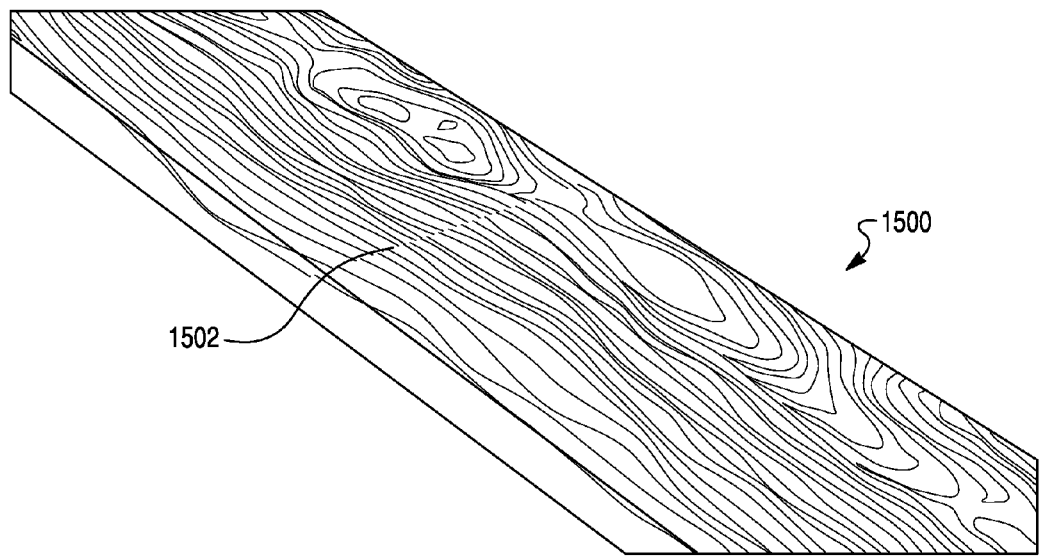
FIG. 15 is an illustration of a laser engraved article demonstrating visual impact of demarcation according to one embodiment of the invention.
Figure 16:
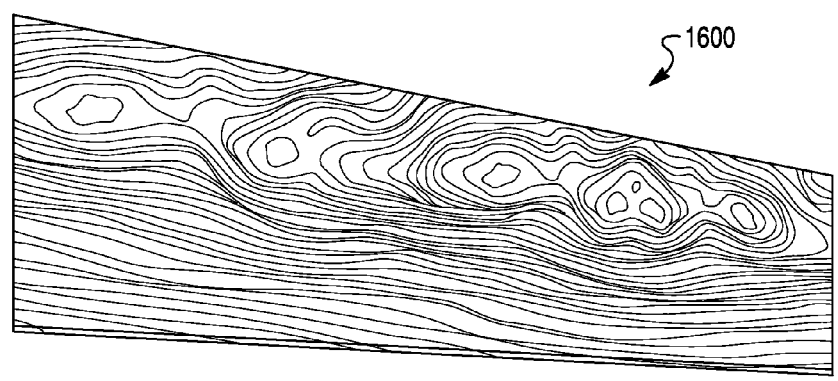
FIG. 16 is an illustration of a laser engraved article demonstrating visual impact of demarcation according to one embodiment of the invention.

The effect of the laser power was tested. FIGS. 15 and 16 are illustrations laser engraved articles demonstrating visual impact of demarcation according to embodiments of the invention. FIG. 15 shows an article 1500 lazed at 1,000 watts power. FIG. 16 shows an article 1600 lazed at 2,000 watts power with all other parameters equal to article 1500, as indicated in Table I. Comparison of these two samples 1500 and 1600 indicates, surprisingly and unexpectedly, that the higher power tends to mask the degree of demarcation somewhat, but the demarcation was still evident at close examination.

Figure 17:
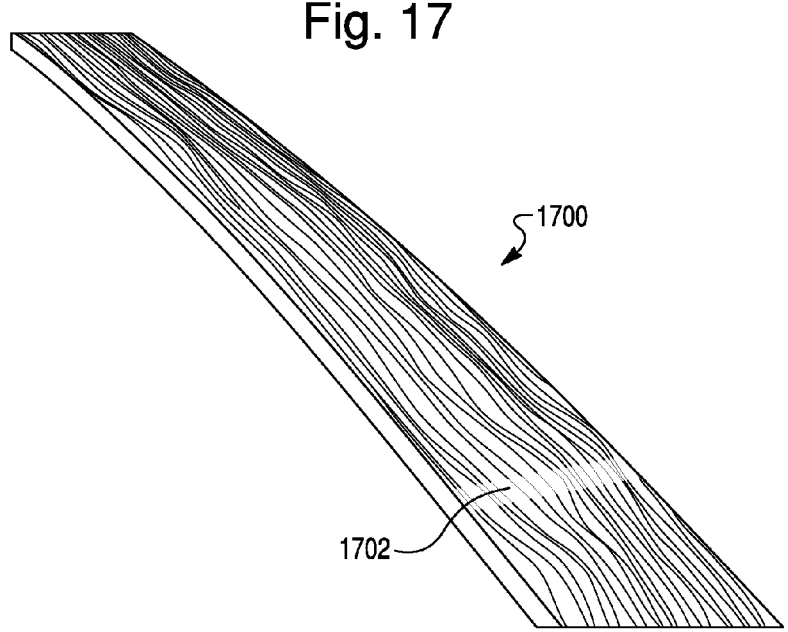
FIG. 17 is an illustration of a laser engraved article demonstrating visual impact of demarcation according to one embodiment of the invention.

FIG. 17 is an illustration of a laser engraved article demonstrating visual impact of demarcation according to one embodiment of the invention. The effect of lines per inch (LPI) etch line density was tested. Lines per inch represent how many laser lines per inch were used to laser etch the graphic. As shown in FIGS. 15 and 17, in the article 1700, the lower line per inch setting of 40 LPI tends to results in lighter lines of demarcation 1702 at the intersection of the component sections compared to demarcation lines 1502 of the article 1500, as shown in FIG. 15, where the same graphic was lazed at 60 LPI.

The effect of different boundary settings in the graphic software was tested. The purpose of the boundary is to prevent the laser from suddenly turning on at the beginning of the laser line and suddenly turning off at the end of the laser line, allowing the laser to over excite. Boundary settings activate the laser at a specified distance prior to the beginning of the laser line and deactivate the laser at a specified distance at the end of the laser line. The controller can execute graphics application software which can receive selections of a boundary length and a boundary power. Boundary power should be set low enough to where it is not visible. Several variations on the boundary setting were examined in which the maximum and minimum settings for both boundary length and boundary power were tested. Changing these settings had little impact on the quality of the applied graphic and did not prevent any lines of demarcation.

The effect of control factor settings was tested. Control factor settings can be used to maintain consistency between where the laser is directed to engrave a line and where the laser actually engraves the line. When the laser is directed to begin engraving a line, there is typically a delay. Selecting an optimum control factor setting will enhance precision, and ensure the laser actually engraves at the exact, directed location. A less than optimum control factor setting could result in the laser engraving before or after the exact directed point, resulting in an undesirable graphic. Control factor trials at the extreme settings identified the optimum control factor setting. Although the optimum control factor settings improved the quality of the graphic, the optimum settings did not eliminate visible of demarcation lines between graphic component sections.

Figure 18:
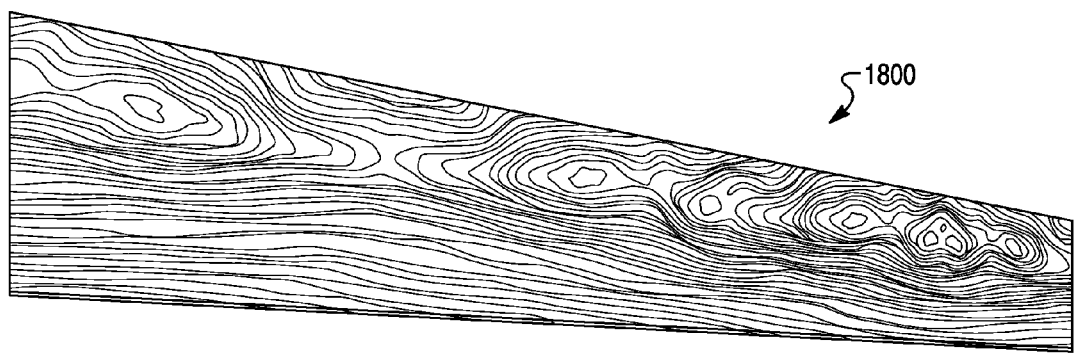
FIG. 18 is an illustration of a laser engraved article demonstrating visual impact of demarcation according to one embodiment of the invention.
Figure 19:
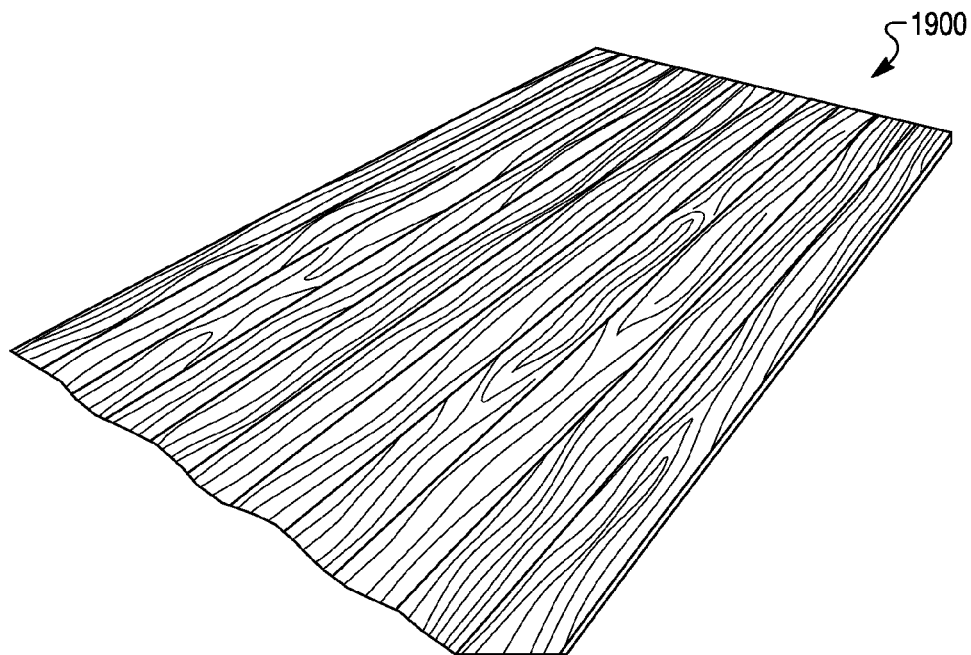
FIG. 19 is an illustration of a laser engraved article demonstrating visual impact of demarcation according to one embodiment of the invention.

The effect of staggering, or interlace, percentage was tested. This percentage relates to how far an etching line from one sectional component of graphic can extend into another. Several trials were conducted changing the new interlace setting in graphics application software from 10% to 50%. FIG. 15 illustrates an article 1500 with a Knotty Pine graphic image laser engraved at 10% staggering. FIG. 18 illustrates an article 1800 with the same Knotty Pine graphic image laser engraved at 50% staggering. Increasing the staggering, or interlace setting to 50% appears to completely eliminate the visual impact, or visibility, of demarcation lines. FIG. 19 shows several separate plastic lumber articles 1900 lazed at 50% interlace with a Teak wood grain graphic pattern. There are no discernable lines of demarcation evident in this case. The actual intersection of the parts lazed appears to be well masked.

Figure 20:
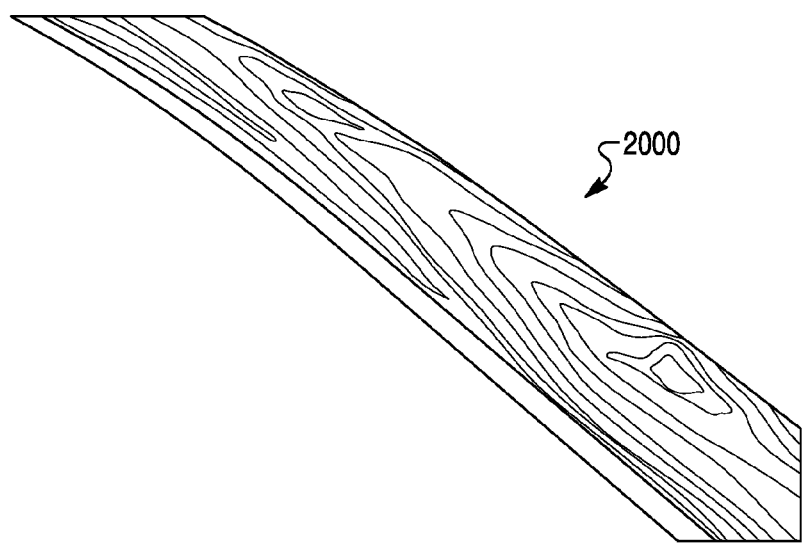
FIG. 20 is an illustration of a laser engraved article demonstrating visual impact of demarcation according to one embodiment of the invention.
Figure 21:
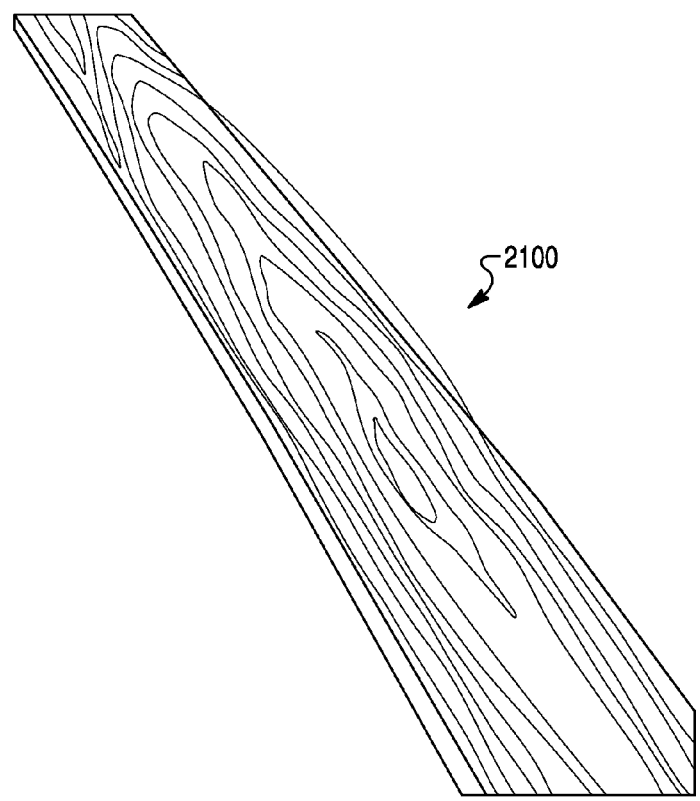
FIG. 21 is an illustration of a laser engraved article demonstrating visual impact of demarcation according to one embodiment of the invention.

The effect of conveyor speed was tested. The conveyor speed measured in feet per minute is a function of the scan speed of the laser beam (measured in meters per second). FIGS. 20 and 21 show the impact of increasing the laser scan speed from 10 to 15 meters per second with a corresponding increase in conveyor line speed from 2.5 feet per minute to 5.5 feet per minute. Doubling the line speed does not change the visual impact of the demarcation lines on article 2000 or article 2100 so long as the interlace is set at 50%. This result is particularly surprising given the unexpected increase in productivity this can allow.

Staggering and randomization work exceptionally well in reducing the visual impact, or masking, demarcation lines separating component sections of a graphic. With the wood grain graphic images tested, the demarcation lines appear to be sufficiently or completely masked resulting in the lazed product appearing surprisingly realistic and quite attractive, appearing like natural wood grains on plastic lumber. These results suggest a potential breakthrough in the industry.

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Although only a few embodiments have been disclosed in detail above, other embodiments are possible and the inventors intend these to be encompassed within this specification and the scope of the appended claims. The specification describes specific examples to accomplish a more general goal that may be accomplished in another way. Modifications and equivalents will be apparent to practitioners skilled in this art and are encompassed within the spirit and scope of the appended claims and their appropriate equivalents. This disclosure is intended to be exemplary, and the claims are intended to cover any modification or alternative which might be predictable to a person having ordinary skill in the art. For example, other kinds and wattages of lasers, beyond those described above, could be used with this technique.

What is claimed is:

1. A method for reducing a visual impact of a demarcation line of a graphic, the method comprising:
    separating a graphic into a first component section and a second component section, the first and second component sections separated by a demarcation line;
    laser engraving a first plurality of lines associated with the first component section on a surface of an article;
    laser engraving a second plurality of lines associated with the second component section on the surface of the article; and
    controlling said laser engraving by adjusting the lengths of the first plurality of lines and the second plurality of lines to stagger the first plurality of lines with the second plurality of lines to reduce the visual impact along the demarcation line separating the first component section of the graphic and the second component section of the graphic.

2. The method according to claim 1, wherein said staggering the first plurality of lines with the second plurality of lines comprises adjusting the lengths of the first plurality of lines and the second plurality of lines up to 10%.

3. The method according to claim 1, wherein said staggering the first plurality of lines with the second plurality of lines comprises adjusting the lengths of the first plurality of lines and the second plurality of lines up to 50%.

4. The method according to claim 1, wherein said staggering the first plurality of lines with the second plurality of lines comprises randomizing the laser engraving of at least one of the first plurality of lines and the second plurality of lines by partitioning the lines into a number of random length sub-unit lengths.

5. The method according to claim 1, wherein said controlling further comprises adjusting the line per inch density of said first plurality of lines and said second plurality of lines.

6. The method according to claim 1, wherein said controlling further comprises controlling the laser power of the laser engraving of the first plurality of lines and the second plurality of lines.

7. The method according to claim 1, wherein the graphic is greater in at least one dimension than the field size of a laser engraving the first plurality of lines and the second plurality of lines.

8. The method according to claim 7, wherein said laser engraving the first plurality of lines and said laser engraving the second plurality of lines comprises a continuous "print-on-the-fly" laser etching process where the article is continuously moving and a laser beam etches the graphic on the moving article.

9. The method according to claim 7, further comprising
    indexing the position of the laser engraved first component section of the graphic prior to laser engraving the second component section of the graphic.

10. The method according to claim 7, further comprising
    moving a laser scan head to a location adjacent to the first component section of the graphic to laser engrave the second component section of the graphic to join with the first component section of the graphic.

11. The method according to claim 1, wherein the first component section and the second component section are sequentially laser engraved.

12. The method according to claim 1, wherein a plurality of lasers perform the laser engraving of the first plurality of lines and the laser engraving of the second plurality of lines.

13. The method according to claim 1, further comprising ink-jet printing an ink jet graphic on said article the surface of the article.

14. The method of claim 1, further comprising:
    providing a laser having a defined native field size;
    formatting a graphic having at least one dimension exceeding the defined native field size into a plurality of portions which collectively define a unity graphic image;
    providing a surface having a dimension exceeding the native field size; and
    laser engraving the plurality of portions onto the surface to reproduce the unitary graphic image onto the surface.

15. The method of claim 1,
    wherein the article is selected from the group consisting of plastic lumber, glass, stone, ceramic, granite, leather, wood, engineered wood, laminates, metal, specialty polymers, gypsum, fiberglass reinforced plastic, wood composites, vinyl, acrylic, polyvinylchloride, hardboard, veneer, low profile carpet tiles, fabrics, and paper.

16. The method of claim 5, wherein said adjusting the line per inch density of the first plurality of lines and the second plurality of lines reduces the line per inch density of the first plurality of lines and the second plurality of lines adjacent the demarcation line.

17. A method for reducing a visual impact of a demarcation line of a graphic, the method comprising:
    separating a graphic into a first component section and a second component section, the first and second component sections separated by a demarcation line;
    laser engraving a first plurality of lines associated with the first component section on a surface of an article;
    laser engraving a second plurality of lines associated with the second component section on the surface of the article; and controlling said laser engraving by adjusting the line per inch density of the first plurality of lines and the second plurality of lines to reduce the visual impact of the demarcation line separating the first component section of the graphic and the second component section of the graphic.

18. The method of claim 17, wherein said adjusting the line per inch density of the first plurality of lines and the second plurality of lines reduces the line per inch density of the first plurality of lines and the second plurality of lines adjacent the demarcation line.

19. The method of claim 18, wherein the line per inch density is reduced to 40 lines per inch.

20. The method of claim 17, wherein said controlling further comprises adjusting the lengths of the first plurality of lines and the second plurality of lines to stagger the first plurality of lines with the second plurality of lines.

* * * * *